US009405299B2

(12) United States Patent
Hakumura et al.

(10) Patent No.: US 9,405,299 B2
(45) Date of Patent: Aug. 2, 2016

(54) CONTROL DEVICE

(75) Inventors: Yomei Hakumura, Susono (JP); Hirokazu Kobayashi, Obu (JP)

(73) Assignee: AISIN AW CO., LTD., Anjo (JP)

( * ) Notice: Subject to any disclaimer, the term of this patent is extended or adjusted under 35 U.S.C. 154(b) by 361 days.

(21) Appl. No.: 14/122,094

(22) PCT Filed: Aug. 7, 2012

(86) PCT No.: PCT/JP2012/070095
§ 371 (c)(1),
(2), (4) Date: Nov. 25, 2013

(87) PCT Pub. No.: WO2013/021998
PCT Pub. Date: Feb. 14, 2013

(65) Prior Publication Data
US 2014/0100701 A1   Apr. 10, 2014

(30) Foreign Application Priority Data

Aug. 8, 2011  (JP) ................................. 2011-173220

(51) Int. Cl.
*G05D 17/02* (2006.01)
*B60L 11/14* (2006.01)
(Continued)

(52) U.S. Cl.
CPC .............. *G05D 17/02* (2013.01); *B60L 11/123* (2013.01); *B60L 11/14* (2013.01); *B60L 15/007* (2013.01);
(Continued)

(58) Field of Classification Search
CPC ........... G05D 17/02; H02P 6/10; H02P 21/05; B60L 15/007; B60L 11/123; B60L 11/14; B60L 2210/40; B60L 2270/145; Y02T 10/644; Y02T 10/6217; Y02T 10/7241; Y02T 10/643; Y02T 10/7077

USPC ......................................................... 700/280
See application file for complete search history.

(56) References Cited

U.S. PATENT DOCUMENTS

2010/0244755 A1   9/2010   Kinugasa et al.

FOREIGN PATENT DOCUMENTS

| DE | 198 01 542 A1 | 7/1999 |
|---|---|---|
| JP | A-2000-125410 | 4/2000 |

(Continued)

OTHER PUBLICATIONS

Alberti et al., "IPM Machine Drive Design and Tests for an Integrated Starter-Alternator Application," *IEEE Transactions on Industry Applications*, 2010, vol. 46, No. 3, pp. 993-1001.

(Continued)

*Primary Examiner* — Carlos Ortiz Rodriguez
(74) *Attorney, Agent, or Firm* — Oliff PLC

(57) ABSTRACT

A control device configured with a torque/current computation section, an actual current computation section, a current feedback control section, and a voltage control section. A two-axis rotating coordinate system has a first axis defined in a direction of field magnetic flux of a magnet provided in the rotor, and a second axis defined in a direction that is shifted by an electrical angle of 90 degrees with respect to the first axis. In the case where a torque command includes periodic torque vibration, the torque/current computation section executes first-axis command fixation control in which a first-axis current command, which is a first-axis component of the two-phase current command, is fixed at a predetermined value and a second-axis current command, which is a second-axis component of the two-phase current command, is vibrated in accordance with the torque vibration.

11 Claims, 12 Drawing Sheets

(51) Int. Cl.
  *H02P 21/05* (2006.01)
  *B60L 11/12* (2006.01)
  *B60L 15/00* (2006.01)
  *H02P 6/10* (2006.01)

(52) U.S. Cl.
  CPC *H02P 6/10* (2013.01); *H02P 21/05* (2013.01); *B60L 2210/40* (2013.01); *B60L 2270/145* (2013.01); *Y02T 10/6217* (2013.01); *Y02T 10/643* (2013.01); *Y02T 10/644* (2013.01); *Y02T 10/645* (2013.01); *Y02T 10/7077* (2013.01); *Y02T 10/7241* (2013.01)

(56) References Cited

FOREIGN PATENT DOCUMENTS

| | | |
|---|---|---|
| JP | A-2001-95274 | 4/2001 |
| JP | A-2002-223582 | 8/2002 |
| JP | A-2006-33969 | 2/2006 |
| JP | A-2010-239681 | 10/2010 |

OTHER PUBLICATIONS

Translation of Jan. 22, 2014 German Office Action issued in German Application No. 11 2012 002 010.3.
International Search Report issued in International Patent Application No. PCT/JP2012/070095 dated Nov. 6, 2012.

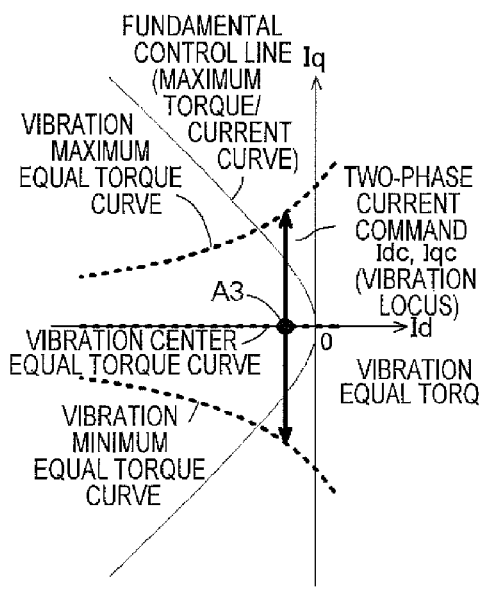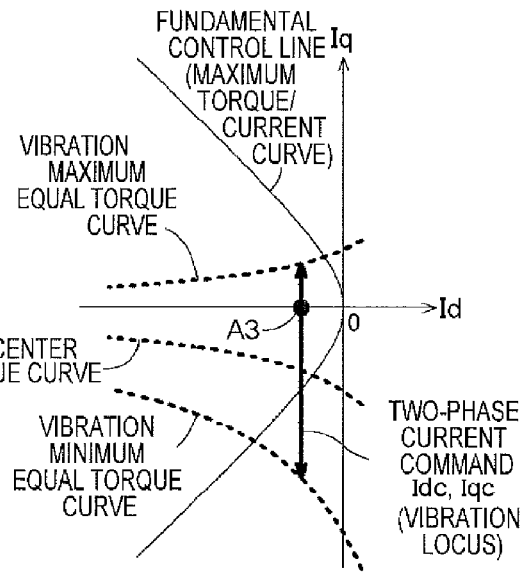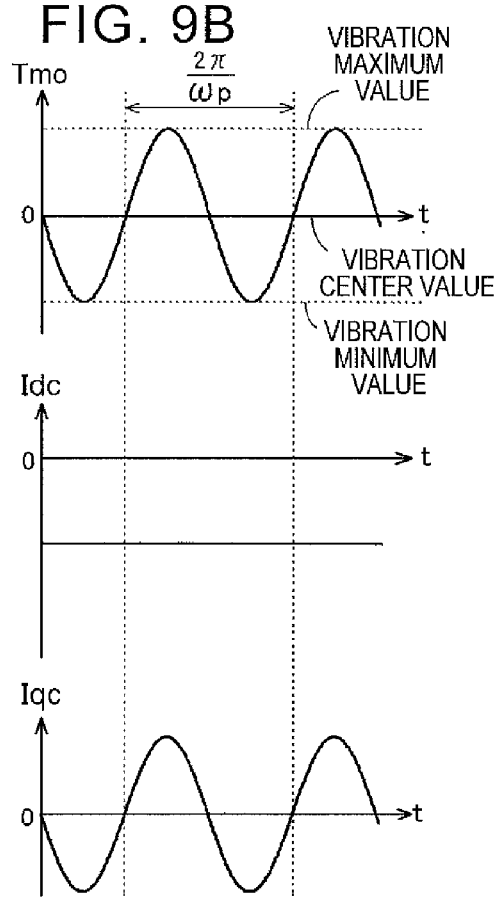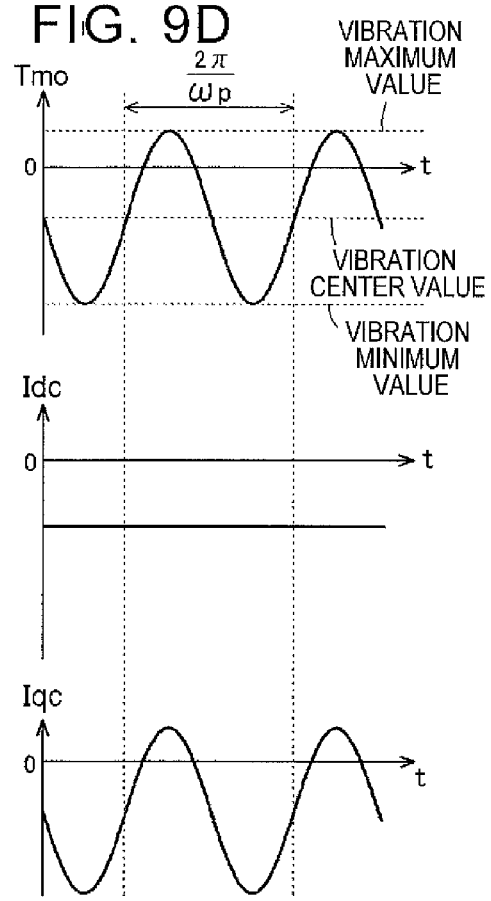

CONTROL DEVICE

INCORPORATION BY REFERENCE

The disclosure of Japanese Patent Application No. 2011-173220 filed on Aug. 8, 2011 including the specification, drawings and abstract is incorporated herein by reference in its entirety.

BACKGROUND OF THE INVENTION

The present invention relates to a control device that controls a rotary electric machine having a rotor.

DESCRIPTION OF THE RELATED ART

Regarding the control device described above, Japanese Patent Application Publication No. 2006-33969 (JP 2006-33969 A) mentioned below, for example, discloses a technology in which a rotary electric machine is coupled to an internal combustion engine and caused to output torque for suppressing periodic torque vibration transferred from the internal combustion engine. In this event, a torque command for the rotary electric machine is a torque command for torque that is opposite in phase to the transferred torque vibration.

If the torque command includes periodic torque vibration, however, a current command computed on the basis of the torque command may include a vibration component at a frequency that is higher in order than the frequency of the torque vibration. This may make it difficult to design a current feedback control system for obtaining an actual current with good performance to follow the current command.

SUMMARY OF THE INVENTION

Thus, it is desirable to provide a control device for a rotary electric machine capable of suppressing occurrence of a vibration component in a current command in computing the current command on the basis of a torque command even in the case where the torque command includes periodic torque vibration.

According to an aspect of the present invention, a control device that controls a rotary electric machine having a rotor includes: a torque/current computation section that uses a two-axis rotating coordinate system that is a rotating coordinate system with two axes that rotate in synchronization with an electrical angle of the rotor, and that computes a two-phase current command obtained by representing a command value for a current caused to flow through the rotary electric machine using the two-axis rotating coordinate system on the basis of a torque command for torque to be output from the rotary electric machine; an actual current computation section that computes a two-phase actual current represented in the two-axis rotating coordinate system on the basis of an actual current that flows through the rotary electric machine; a current feedback control section that varies a two-phase voltage command, which is obtained by representing a voltage command for a voltage to be applied to the rotary electric machine in the two-axis rotating coordinate system, such that the two-phase actual current becomes closer to the two-phase current command; and a voltage control section that controls a voltage to be applied to the rotary electric machine on the basis of the two-phase voltage command. In the control device, the two-axis rotating coordinate system has a first axis defined in a direction of field magnetic flux of a magnet provided in the rotor, and a second axis defined in a direction that is shifted by an electrical angle of 90 degrees with respect to the first axis; and in the case where the torque command includes periodic torque vibration, the torque/current computation section executes first-axis command fixation control in which a first-axis current command, which is a first-axis component of the two-phase current command, is fixed at a predetermined value and a second-axis current command, which is a second-axis component of the two-phase current command, is vibrated in accordance with the torque vibration.

The term "rotary electric machine" as used herein refers to any of a motor (electric motor), a generator (electric generator), and a motor generator that functions both as a motor and as a generator as necessary.

According to the aspect described above, the first-axis current command is fixed at a predetermined value. Thus, in computing the two-phase current command on the basis of the torque command, it is possible to reduce a periodic vibration component caused in the first-axis current command to 0, and to suppress a periodic vibration component caused in the second-axis current command to a vibration component that is similar to the vibration component included in the torque command.

Hence, even in the case where the torque command includes periodic torque vibration, it is possible to suppress degradation in performance of the actual current to follow the first-axis current command, and to suppress degradation in performance of the actual current to follow the second-axis current command to a minimum. Therefore, even in the case where the torque command is periodically vibrating, it is possible to suppress degradation in performance of output torque to follow the torque command.

A fundamental control line may prescribe a two-phase current command for fundamental control performed to cause the rotary electric machine to output output torque matching the torque command in the case where the torque command does not include the torque vibration, and the fundamental control line may be a locus of coordinate points having such first-axis current command and second-axis current command that the first-axis current command becomes larger in a negative direction as an absolute value of the second-axis current command becomes larger from an origin in the two-axis rotating coordinate system; and in executing the first-axis command fixation control, the torque/current computation section may decide the first-axis current command such that a vibration locus of the two-phase current command crosses the fundamental control line at at least one location in the two-axis rotating coordinate system.

According to the configuration, it is possible to vibrate the two-phase current command in contact with or across the fundamental control line, and to bring the two-phase current command closer to the fundamental control line. Hence, even in the case where the first-axis command fixation control is executed, it is possible to maintain the effect targeted by the fundamental control with as little reduction in effect as possible.

In executing the first-axis command fixation control, the current feedback control section may calculate a first-axis voltage command, which is a first-axis component of the two-phase voltage command, through proportional-integral computation on the basis of deviation between the first-axis current command and a first-axis component of the two-phase actual current, and may calculate a second-axis voltage command, which is a second-axis component of the two-phase voltage command, through proportional-integral computation and computation performed using a harmonic-wave model having characteristics of a periodic function with a frequency of the torque vibration on the basis of deviation between the second-axis current command and a second-axis component of the two-phase actual current.

As described above, even in the case where the torque command includes periodic torque vibration, the first-axis current command does not include a periodic vibration component. Thus, it is possible to control the actual current with high performance to follow the first-axis current command through the proportional-integral computation. Meanwhile, the second-axis current command includes a periodic vibration component that is similar to the vibration component included in the torque command. Thus, it is possible to suppress degradation in performance of the actual current to follow the second-axis current command by performing computation using a harmonic-wave model corresponding to the frequency of the torque vibration in addition to the proportional-integral computation. Thus, even if the torque command periodically vibrates, it is possible to suppress degradation in performance of output torque to follow the torque command.

In addition, the computation performed using a harmonic-wave model is performed only for the current feedback control system for the second axis, and the harmonic-wave model corresponds only to the frequency of the torque vibration. Thus, it is possible to suppress complication of the computation process and an increase in computation load on the control device.

A fundamental control line may prescribe a two-phase current command for fundamental control performed to cause the rotary electric machine to output output torque matching the torque command in the case where the torque command does not include the torque vibration, and the fundamental control line may be a locus of coordinate points having such first-axis current command and second-axis current command that the first-axis current command becomes larger in a negative direction as an absolute value of the second-axis current command becomes larger from an origin in the two-axis rotating coordinate system; a vibration center equal torque curve may be a locus of coordinate points having the first-axis current command and the second-axis current command at which output torque of the rotary electric machine is a vibration center value of the torque command in the two-axis rotating coordinate system; and in executing the first-axis command fixation control, the torque/current computation section may decide the first-axis current command as a value determined by an intersection of the fundamental control line and the vibration center equal torque curve.

According to the configuration, the first-axis current command can be decided on the fundamental control line on the basis of the vibration center value corresponding to the torque command including no periodic torque vibration. The decision of the first-axis current command can be executed using the process of the fundamental control, and thus it is possible to suppress complication of the computation process and an increase in computation load on the control device.

A fundamental control line may prescribe a two-phase current command for fundamental control performed to cause the rotary electric machine to output output torque matching the torque command in the case where the torque command does not include the torque vibration, and the fundamental control line may be a locus of coordinate points having such first-axis current command and second-axis current command that the first-axis current command becomes larger in a negative direction as an absolute value of the second-axis current command becomes larger from an origin in the two-axis rotating coordinate system; a maximum absolute value equal torque curve may be a locus of coordinate points having the first-axis current command and the second-axis current command at which output torque of the rotary electric machine is one of a vibration maximum value and a vibration minimum value of the torque command, an absolute value of which is larger, in the two-axis rotating coordinate system; and in executing the first-axis command fixation control, the torque/current computation section may decide the first-axis current command as a value determined by an intersection of the fundamental control line and the maximum absolute value equal torque curve.

According to the configuration, the vibration locus of the two-phase current command is positioned within a region on the negative side of the first-axis current command with respect to the fundamental control line (hereinafter referred to as "first-axis negative-side region") in the two-axis rotating coordinate system. The first-axis negative-side region overlaps a region normally used for control (for example, weakening flux control) of a rotary electric machine performed using a two-axis rotating coordinate system. Therefore, in the first-axis negative-side region, the relationship between output torque of the rotary electric machine and the two-phase current command is often identified with high accuracy. It is possible to calculate the first-axis current command in the first-axis command fixation control on the basis of such relationship, and to improve the calculation accuracy. Hence, even in the case where the torque command is periodically vibrating, it is possible to cause output torque to match the torque command with high accuracy.

In executing the first-axis command fixation control, the torque/current computation section may decide the first-axis current command so as to minimize an amount of current flowing through the rotary electric machine during one period of the torque vibration.

According to the configuration, in executing the first-axis command fixation control, it is possible to minimize the amount of current flowing through the rotary electric machine during one period, and to minimize heat generated by the resistance of the coil, that is, the copper loss.

In executing the first-axis command fixation control, the torque/current computation section may decide the first-axis current command as 0.

According to the configuration, in which the first-axis current command is simply set to 0, it is possible to minimize the computation process for fixing the first-axis current command. In addition, setting the first-axis current command to 0 can simplify the computation process for setting the second-axis current command. Hence, it is possible to suppress complication of the computation process and an increase in computation load on the control device.

The torque vibration may be sinusoidal.

According to the configuration, it is possible to make the second-axis current command also sinusoidal, and to simplify the current feedback control system for the second axis.

The fundamental control line may be a maximum torque/current curve that is a locus of coordinate points having the first-axis current command and the second-axis current command at which output torque of the rotary electric machine is maximum for a magnitude of a current flowing through the rotary electric machine.

According to the configuration, it is possible to maintain a high current/torque conversion efficiency in executing the first-axis command fixation control.

BRIEF DESCRIPTION OF THE DRAWINGS

FIGS. 9A to 9D illustrate the process performed by the control device according to the embodiment of the present invention;

DETAILED DESCRIPTION OF THE EMBODIMENTS

An embodiment of the present invention will be described with reference to the drawings.

A rotary electric machine MG has a rotor and a stator. The stator is fixed to a non-rotary member. The rotor is rotatably supported radially inwardly of the stator. In the embodiment, the rotary electric machine MG is an interior permanent magnet synchronous motor (IPMSM) in which a permanent magnet is embedded inside the rotor. An electromagnet may be provided in place of the permanent magnet.

Figure 1:
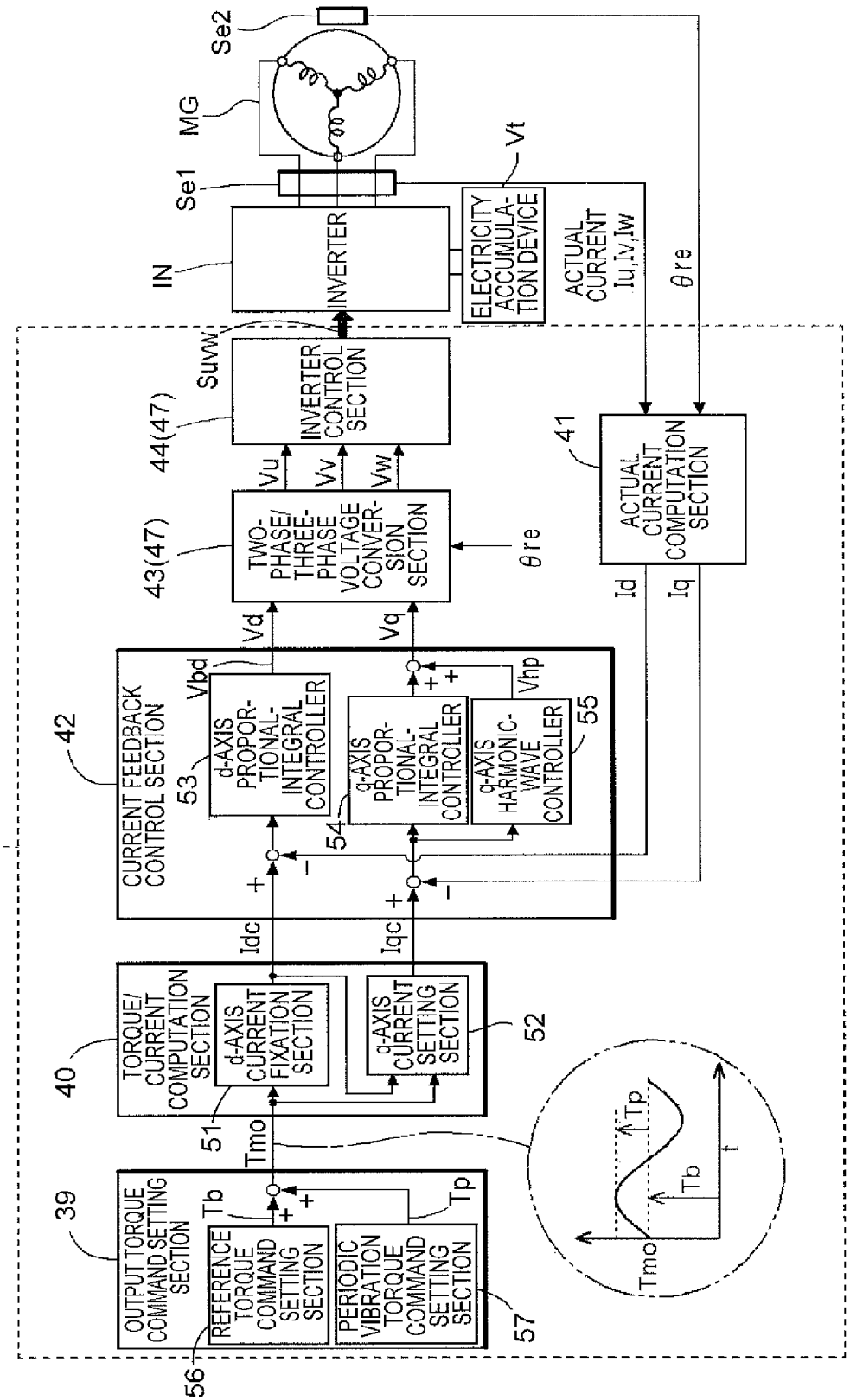
FIG. 1 is a block diagram showing the configuration of a control device according to an embodiment of the present invention.

As shown in FIG. 1, coils for three phases provided in the stator of the rotary electric machine MG are electrically connected to an electricity accumulation device Vt via an inverter IN that performs a DC/AC conversion. The rotary electric machine MG can function as a motor (electric motor) that is supplied with electric power to produce power and as a generator (electric generator) that is supplied with power to generate electric power. The inverter IN includes a plurality of switching elements that convert DC power of the electricity accumulation device Vt into AC power to drive the rotary electric machine MG, or that convert AC power generated by the rotary electric machine MG into DC power to charge the electricity accumulation device Vt.

As shown in FIG. 1, a control device 30 that controls the rotary electric machine MG includes an output torque command setting section 39, a torque/current computation section 40, an actual current computation section 41, a current feedback control section 42, and a two-phase/three-phase voltage conversion section 43 and an inverter control section 44 that serve as a voltage control section 47.

The output torque command setting section 39 sets an output torque command value Tmo serving as a torque command for torque to be output from the rotary electric machine MG. The torque/current computation section 40 computes two-phase current commands Idc, Iqc, which are obtained by representing a command value for a current caused to flow through the rotary electric machine MG in a dq-axis rotating coordinate system, on the basis of the output torque command value Tmo. The actual current computation section 41 computes two-phase actual currents Id, Iq, represented in the dq-axis rotating coordinate system, on the basis of an actual current that flows through the rotary electric machine MG. The current feedback control section 42 varies two-phase voltage commands Vd, Vq, which are obtained by representing a voltage command for a voltage to be applied to the rotary electric machine MG in the dq-axis rotating coordinate system, such that the two-phase actual currents Id, Iq become closer to the two-phase current commands Idc, Iqc. The two-phase/three-phase voltage conversion section 43 and the inverter control section 44 control a voltage to be applied to the rotary electric machine MG on the basis of the two-phase voltage commands Vd, Vq.

Figure 2:
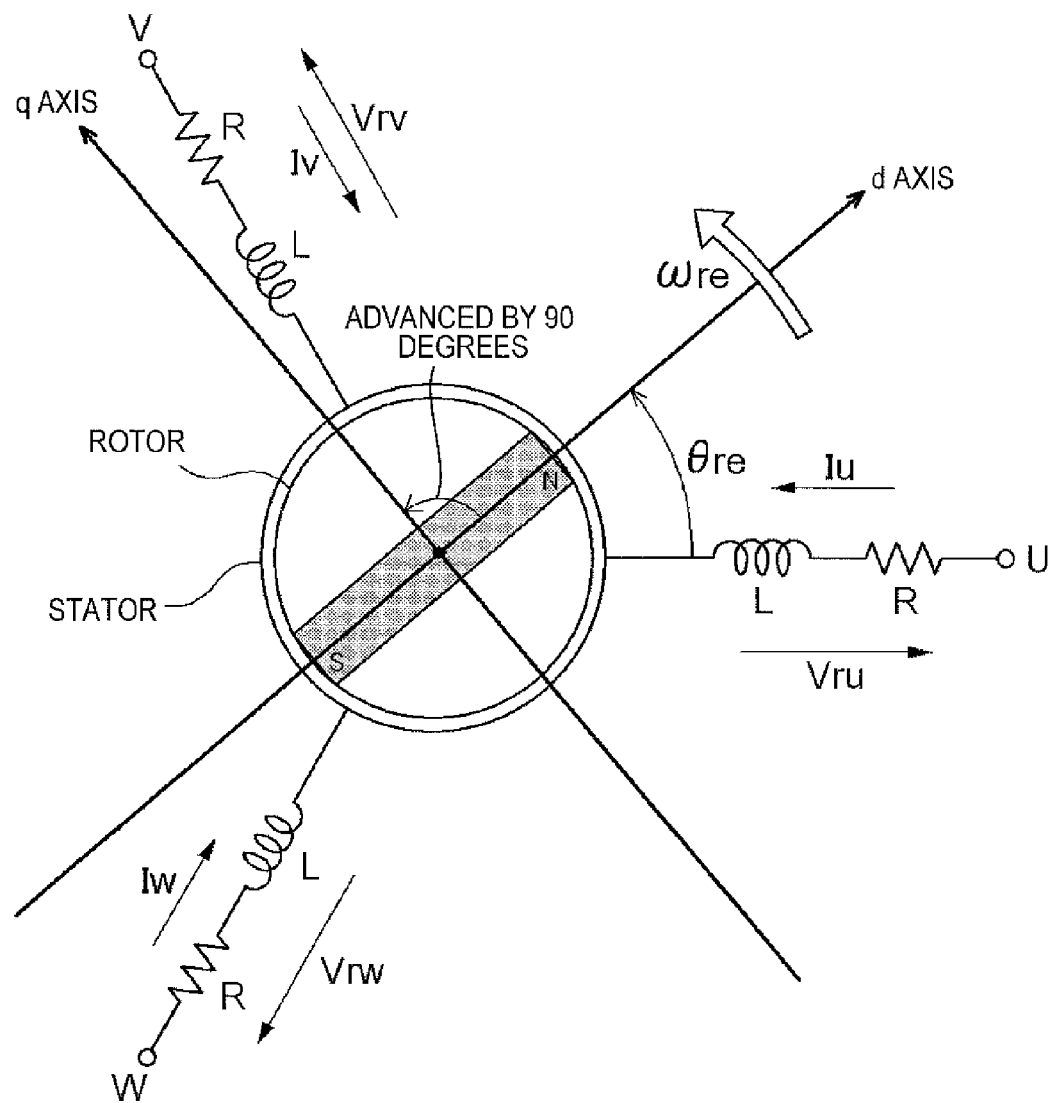
FIG. 2 illustrates a two-axis rotating coordinate system according to the embodiment of the present invention.

Here, the dq-axis rotating coordinate system, a model of which is shown in FIG. 2, is a rotating coordinate system with two axes, namely a d axis and a q axis, that rotate in synchronization with the electrical angle of the rotor.

The d axis is defined in the direction of field magnetic flux of the magnet provided in the rotor (direction of the N pole). The q axis is defined in a direction that is shifted by an electrical angle of 90 degrees (in the example, the direction that is advanced in phase by 90 degrees) with respect to the d axis. The q axis may be defined in the direction that is delayed in phase by an electrical angle of 90 degrees with respect to the d axis.

In the embodiment, the electrical angle of the d axis (magnetic pole) with reference to a U-phase coil provided in the stator is defined as a magnetic pole position θre, and the electrical angular velocity of the d axis (magnetic pole) is defined as a magnetic pole rotational speed ωre.

In such a configuration, as shown in FIG. 1, the torque/current computation section 40 includes a d-axis current fixation section 51 and a q-axis current setting section 52. The torque/current computation section 40 is characterized by executing d-axis command fixation control in the case where the output torque command value Tmo includes periodic torque vibration. In the d-axis command fixation control, the d-axis current fixation section 51 fixes the d-axis current command Idc, which is a d-axis component of the two-phase current commands, at a predetermined value, and the q-axis current setting section 52 vibrates the q-axis current command Iqc, which is a q-axis component of the two-phase current commands, in accordance with the torque vibration.

The dq-axis rotating coordinate system corresponds to the "two-axis rotating coordinate system" according to the present invention. The d axis corresponds to the "first axis" according to the present invention. The q axis corresponds to the "second axis" according to the present invention. The d-axis current command Idc corresponds to the "first-axis current command" according to the present invention. The q-axis current command Iqc corresponds to the "second-axis current command" according to the present invention. The d-axis command fixation control corresponds to the "first-axis command fixation control" according to the present invention.

The control device 30 according to the embodiment will be described in detail below.

1. Configuration of Control Device 30

Next, the configuration of the control device 30 which controls the rotary electric machine MG will be described.

The control device 30 includes an arithmetic processing unit such as a CPU serving as a core member, a storage device such as a random access memory (RAM) configured to read and write data from and into the arithmetic processing unit and a read only memory (ROM) configured to read data from the arithmetic processing unit, and so forth. The functional sections 39 to 47 of the control device 30 etc. shown in FIG. 1 are formed by software (a program) stored in the ROM of the control device 30 or the like, hardware such as a separately provided arithmetic circuit, or a combination of both.

An electric signal output from sensors Se1 and Se2 is input to the control device 30. The control device 30 calculates information detected by the sensors on the basis of the input electrical signal.

The current sensor Se1 is a sensor that detects currents flowing through the coils for the respective phases, and is provided on wires connecting between the inverter IN and the coils for the respective phases. The control device 30 detects actual currents Iu, Iv, Iw flowing through the coils for the respective phases on the basis of a signal input from the current sensor Se1.

The rotational speed sensor Se2 is a sensor that detects the rotational speed and the rotational angle of the rotor, and is attached to a rotary shaft of the rotor. The control device 30 detects the magnetic pole position θre and the magnetic pole rotational speed core on the basis of a signal input from the rotational speed sensor Se2. A resolver, a rotary encoder, or the like may be used as the rotational speed sensor Se2.

The control device 30 is a control device that controls an operation of the rotary electric machine MG. As shown in FIG. 1, the control device 30 includes functional sections such as the output torque command setting section 39, the torque/current computation section 40, the actual current computation section 41, the current feedback control section 42, and the two-phase/three-phase voltage conversion section 43, and the inverter control section 44, and controls the functional sections so as to cooperate with each other to cause the rotary electric machine MG to output torque at the output torque command value Tmo.

1-1. Setting of Output Torque Command Value

The output torque command value Tmo may include periodic torque vibration.

In the embodiment, the output torque command setting section 39 is configured to include a periodic vibration torque command setting section 57 that calculates a vibration torque command value Tp that is a periodic torque vibration component included in the output torque command value Tmo, and a reference torque command setting section 56 that calculates a reference torque command value Tb that is a command value including no periodic torque vibration component and that is a center value of the vibrating output torque command value Tmo. The output torque command setting section 39 is configured to set the output torque command value Tmo to a value obtained by adding the reference torque command value Tb and the vibration torque command value Tp. The output torque command value Tmo corresponds to the "torque command" according to the present invention.

In the embodiment, the periodic torque vibration included in the output torque command value Tmo is sinusoidal.

Specifically, the vibration torque command value Tp is a sine wave with a torque vibration frequency ωp (angular frequency) as indicated by the following formula (1):

$$Tp(t) = \Delta Tp \sin(\omega p t) \quad (1)$$

where ΔTp is the amplitude of the vibration torque command value Tp. The vibration torque command value Tp may be a cosine wave.

1-2. Torque Control and Current Feedback Control

The control device 30 is configured to calculate a current command on the basis of the output torque command value Tmo, and to control the rotary electric machine MG through current feedback control using a vector control method. In the vector control, current feedback control is performed in which a current command is set in the dq-axis rotating coordinate system, the actual currents Iu, Iv, Iw flowing through the coils for the respective phases are converted into the two-phase actual currents Id, Iq, represented in the dq-axis rotating coordinate system, on the basis of the magnetic pole position θre, and a voltage to be applied to the rotary electric machine MG is controlled such that the two-phase actual currents Id, Iq become closer to the current command. The torque control and the current feedback control according to the embodiment will be described in detail below.

1-2-1. Torque/Current Computation Section 40

The torque/current computation section 40 is a functional section that computes the two-phase current commands Idc, Iqc, which are obtained by representing a command value for a current caused to flow through the rotary electric machine MG in the dq-axis rotating coordinate system, on the basis of the output torque command value Tmo for torque to be output from the rotary electric machine MG.

In the embodiment, the torque/current computation section 40 is configured to calculate the d-axis current command Idc and the q-axis current command Iqc that cause the rotary electric machine MG to output torque according to the output torque command value Tmo.

The relationship between output torque Tm of the rotary electric machine MG and the d-axis actual current Id and the q-axis actual current Iq can be represented as indicated by the following formula (2):

$$Tm = Pn(\Phi + (Ld - Lq)Id)Iq \quad (2)$$

where Φ is flux linkage caused by the permanent magnet, Ld is the d-axis inductance of the coil, Lq is the q-axis inductance of the coil, and Pn is the number of pole pairs. The interior permanent magnet synchronous motor has saliency with Ld<Lq.

<Equal Torque Curve>

It is seen from the formula (2) that there are an infinite number of combinations of the d-axis current command Idc and the q-axis current command Iqc that cause the rotary electric machine MG to output the output torque Tm with the same magnitude. This is also seen from the equal torque curves shown in FIG. 3A. Here, the equal torque curve is the locus of coordinate points formed from the d-axis actual current Id and the q-axis actual current Iq that cause the rotary electric machine MG to output the output torque Tm with the same magnitude in the dq-axis rotating coordinate system.

The equal torque curve is prescribed by the following formula (3) obtained by solving the formula (2) for the q-axis actual current Iq:

$$Iq = \frac{Tm}{Pn(\Phi + (Ld - Lq)Id)} \quad (3)$$

The equal torque curve may be obtained experimentally.

Figure 3A:
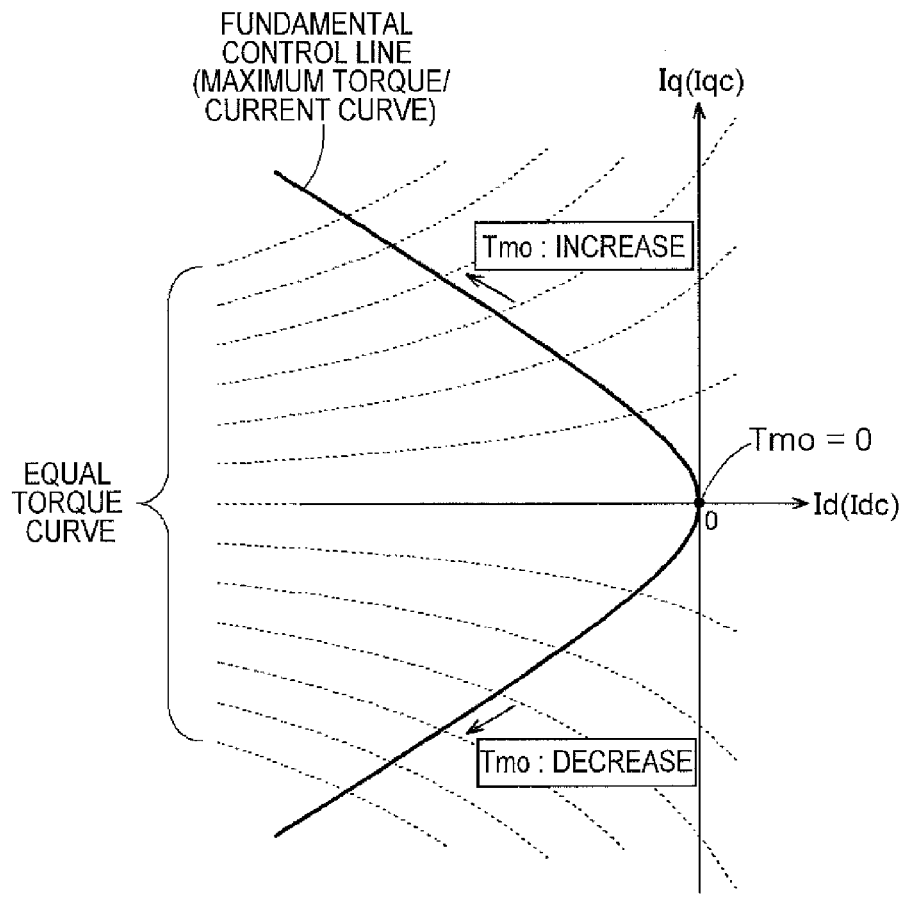
FIGS. 3A to 3C illustrate a process in a comparative example that is different from the embodiment of the present invention.

It is seen from the formula (3) that on condition of equal torque, that is, on condition that the output torque Tm is fixed at a predetermined value, (Ld−Lq) has a negative value, and therefore the q-axis actual current Iq is decreased toward 0 in the case where the output torque Tm has a positive value, is increased toward 0 in the case where the output torque Tm has a positive value, and is 0 in the case where the output torque Tm is 0 as the d-axis actual current Id is decreased from 0 as shown in FIG. 3A.

In addition, it is seen that the q-axis actual current Iq is increased from 0 as the output torque Tm is increased from 0, and is decreased from 0 as the output torque Tm is decreased from 0.

The torque/current computation section 40 is configured to decide the d-axis current command Idc and the q-axis current command Iqc on the basis of the output torque command value Tmo from the infinite number of combinations of the d-axis current command Idc and the q-axis current command Iqc that achieve the output torque command value Tmo.

In the embodiment, in deciding the two-phase current commands Idc, Iqc, the torque/current computation section 40 executes fundamental control in the case where the output torque command value Tmo does not include periodic torque vibration, and executes d-axis command fixation control in the case where the output torque command value Tmo includes periodic torque vibration.

The fundamental control and the d-axis command fixation control will be described below.

1-2-1-1. Fundamental Control

The torque/current computation section 40 is configured to execute the fundamental control in which the d-axis current command Idc and the q-axis current command Iqc are decided on a fundamental control line shown in FIG. 3A on the basis of the output torque command value Tmo in the case where the output torque command value Tmo does not include periodic torque vibration.

Here, the fundamental control line prescribes the two-phase current commands Idc, Iqc for the fundamental control that cause the rotary electric machine MG to output the output torque Tm matching the output torque command value Tmo in the case where the output torque command value Tmo does not include torque vibration. As shown in FIG. 3A, the fundamental control line is the locus of coordinate points formed from such d-axis current command Idc and q-axis current command Iqc that the d-axis current command Idc becomes larger in the negative direction as the absolute value of the q-axis current command Iqc becomes larger from the origin in the dq-axis rotating coordinate system.

In the embodiment, the fundamental control line is a maximum torque/current curve that is the locus of coordinate points formed from the d-axis current command Idc and the q-axis current command Iqc at which the output torque Tm of the rotary electric machine MG is maximum for the magnitude of a current I flowing through the rotary electric machine MG.

Here, the magnitude of the current I flowing through the rotary electric machine MG is the magnitude of a current flowing from the electricity accumulation device Vt to the rotary electric machine MG via the inverter IN, or the magnitude of a current flowing from the rotary electric machine MG to the electricity accumulation device Vt via the inverter IN. In the case where the magnitude of the current I is represented in the dq-axis rotating coordinate system, the magnitude of the current I is the magnitude of a current vector from the origin to a coordinate point formed from the d-axis actual current Id and the q-axis actual current Iq, and can be represented by the following formula (4):

$$I = \sqrt{Id^2 + Iq^2} \tag{4}$$

The maximum torque/current curve is theoretically prescribed by the following formula (5):

$$Id = \frac{\Phi}{2(Lq - Ld)} - \sqrt{\frac{\Phi^2}{4(Lq - Ld)^2} + Iq^2} \tag{5}$$

The maximum torque/current curve may be obtained experimentally.

As shown in FIG. 3A, the maximum torque/current curve is the locus of coordinate points formed from such d-axis current command Idc and q-axis current command Iqc that the d-axis current command Idc (d-axis actual current Id) is decreased from zero as the q-axis current command Iqc (q-axis actual current Iq) is increased from 0 or decreased from 0.

In this way, in the embodiment, the torque/current computation section 40 is configured to execute maximum torque/current control, in which the two-phase current commands Idc, Iqc at which the output torque Tm of the rotary electric machine MG for the same current I flowing through the rotary electric machine MG is maximum are calculated, as the fundamental control executed in the case where the output torque command value Tmo does not include torque vibration.

Alternatively, the torque/current computation section 40 may be configured to execute various control schemes, such as maximum torque flux control and weakening flux control, as the fundamental control. The fundamental control line may be a current line determined by the control schemes. Alternatively, the fundamental control may be a control scheme with a fundamental control line not uniquely determined.

Here, the maximum torque flux control is a control method by which the two-phase current commands Idc, Iqc at which flux linkage is minimized when the rotary electric machine MG generates the same output torque Tm are calculated. The weakening flux control is a control method by which the two-phase current commands Idc, Iqc are calculated such that magnetic flux in the d-axis direction is reduced utilizing the demagnetization effect due to the d-axis armature reaction by passing a negative d-axis current.

As shown in FIG. 3A, the torque/current computation section 40 increases the q-axis current command Iqc from 0 and decreases the d-axis current command Idc from 0 along the maximum torque/current curve (fundamental control line) as the output torque command value Tmo increases from 0. On the other hand, the torque/current computation section 40 decreases the q-axis current command Iqc from 0 and decreases the d-axis current command Idc from 0 along the maximum torque/current curve as the output torque command value Tmo decreases from 0. As indicated by the relationship of the current commands Idc, Iqc with respect to the output torque command value Tmo shown in FIGS. 3B and 3C, respectively, the d-axis current command Idc is calculated to monotonously increase with respect to an increase in output torque command value Tmo in the case where the output torque command value Tmo is less than 0, and to monotonously decrease with respect to an increase in output torque command value Tmo in the case where the output torque command value Tmo is more than 0. Therefore, the relation of the d-axis current command Idc with respect to the output torque command value Tmo is significantly varied between before and after the output torque command value Tmo is varied across 0, and represented by a high-order function when the output torque command value Tmo is around 0.

The q-axis current command Iqc is calculated to monotonously increase with respect to an increase in output torque command value Tmo. In addition, the slope of the q-axis current command Iqc with respect to the output torque command value Tmo is varied between when the output torque command value Tmo is around 0 and when not, and includes a high-order function component for values of the output torque command value Tmo around 0.

The relationship of the current commands Idc, Iqc with respect to the output torque command value Tmo is curved, and includes a high-order function component.

1-2-1-1-1. Problem of Fundamental Control

Next, the problem of a case where fundamental control in which the two-phase current commands Idc, Iqc are decided on the maximum torque/current curve (fundamental control line), unlike the embodiment according to the present invention, in the case where the output torque command value Tmo includes periodic torque vibration will be described.

<Case where Torque Command is Vibrating Around 0>

Figure 4A:
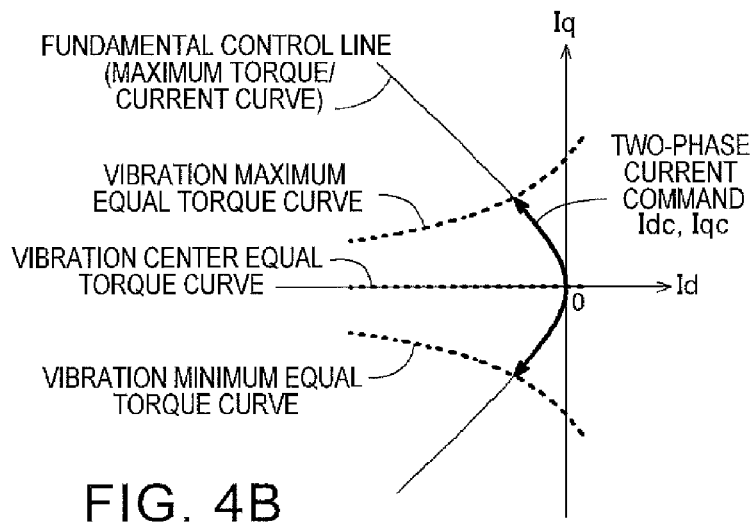
FIGS. 4A and 4B illustrate the process in the comparative example that is different from the embodiment of the present invention.
Figure 4B:
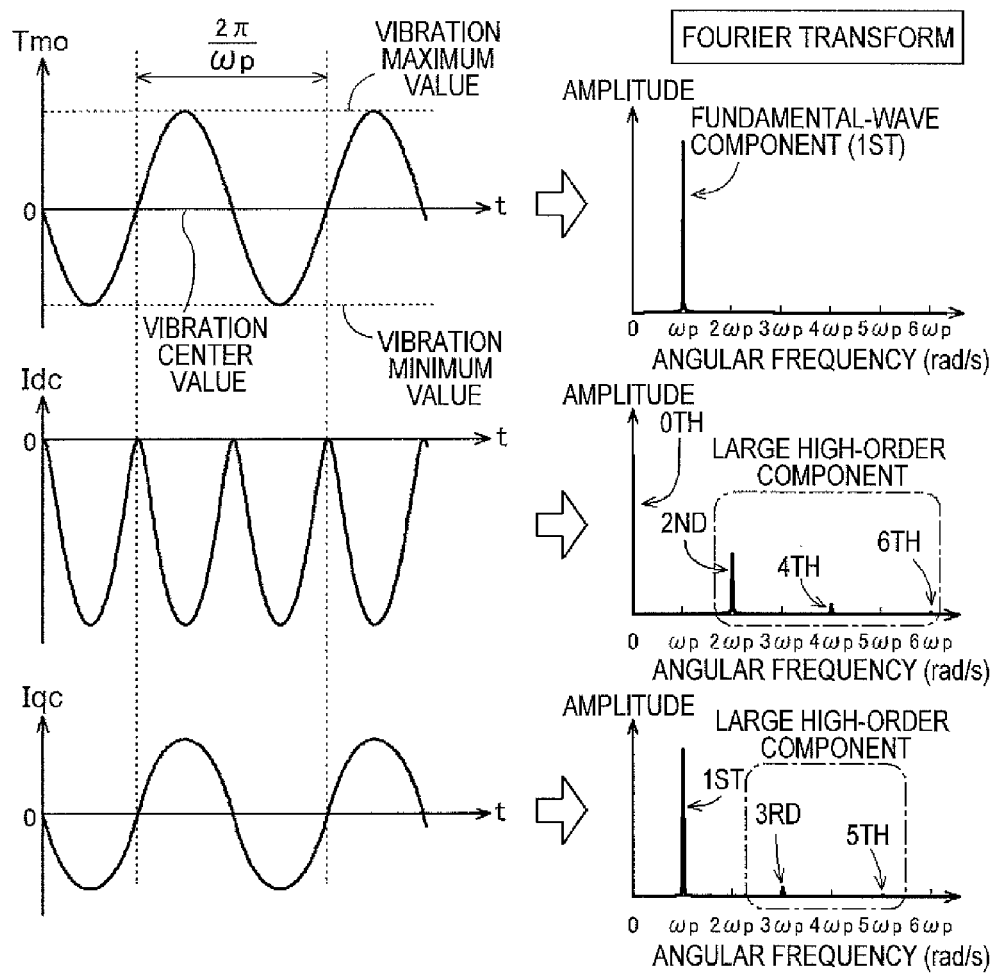

First, a case where the output torque command value Tmo is periodically vibrating around 0 as shown in FIG. 4B will be described.

In this case, as shown in FIG. 4A, the two-phase current commands Idc, Iqc are decided so as to vibrate between a vibration maximum equal torque curve and a vibration minimum equal torque curve on the maximum torque/current curve (fundamental control line) in the dq-axis rotating coordinate system. In FIG. 4A, the vibration locus of the two-phase current commands Idc, Iqc in the dq-axis rotating coordinate system is indicated by a thick line.

Here, the vibration maximum equal torque curve is the locus of coordinate points formed from the d-axis current command Idc and the q-axis current command Iqc at which the output torque Tm of the rotary electric machine MG is the vibration maximum value of the output torque command value Tmo in the dq-axis rotating coordinate system. The vibration minimum equal torque curve is the locus of coordinate points formed from the d-axis current command Idc and the q-axis current command Iqc at which the output torque Tm of the rotary electric machine MG is the vibration minimum value of the output torque command value Tmo in the dq-axis rotating coordinate system. The vibration center equal torque curve is the locus of coordinate points formed from the d-axis current command Idc and the q-axis current command Iqc at which the output torque Tm of the rotary electric machine MG is the vibration center value of the output torque command value Tmo in the dq-axis rotating coordinate system.

Figure 3B:
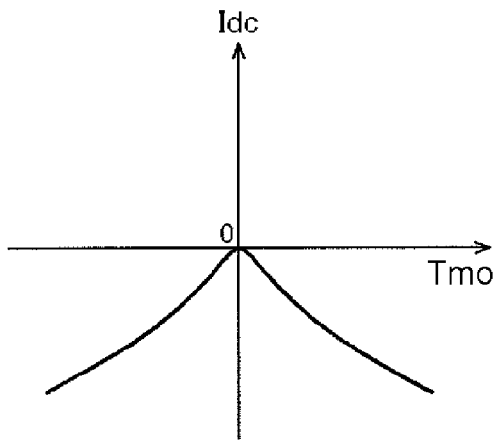
Figure 3C:
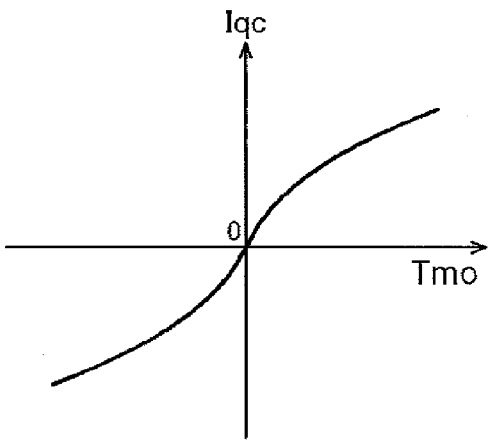

The d-axis current command Idc and the q-axis current command Iqc follow the relationship shown in FIGS. 3B and 3C, respectively, and are calculated on the basis of the output torque command value Tmo. As shown in FIG. 4B, while the output torque command value Tmo vibrates with a sine wave with the torque vibration frequency ωp (torque vibration period: $2\pi/\omega p$), the d-axis current command Idc mainly vibrates at a frequency that is twice the torque vibration frequency ωp, and the q-axis current command Iqc mainly vibrates at the same frequency as the torque vibration frequency ωp. Therefore, as indicated by the frequency characteristics obtained by performing a Fourier transform on each waveform and shown on the right side in FIG. 4B, the output torque command value Tmo has a large amplitude for a component at the torque vibration frequency ωp (fundamental-wave component, first order). The d-axis current command Idc has a larger amplitude for a second-order (2ωp) frequency component, which is twice the torque vibration frequency ωp, than the amplitude for a component at the torque vibration frequency ωp. The q-axis current command Iqc has a large amplitude for a first-order (ωp) frequency component, which is the same as the amplitude for a component at the torque vibration frequency ωp.

In addition, the relationship of the current commands Idc, Iqc with respect to the output torque command value Tmo is represented by a second- or higher-order function. Therefore, the d-axis current command Idc has an amplitude for high-order, such as fourth-order (4ωp) and sixth-order (6ωp), frequency components. The q-axis current command Iqc has an amplitude for high-order, such as third-order (3ωp) and fifth-order (5ωp), frequency components.

<Case where Torque Command is Vibrating Across 0>

Figure 5A:
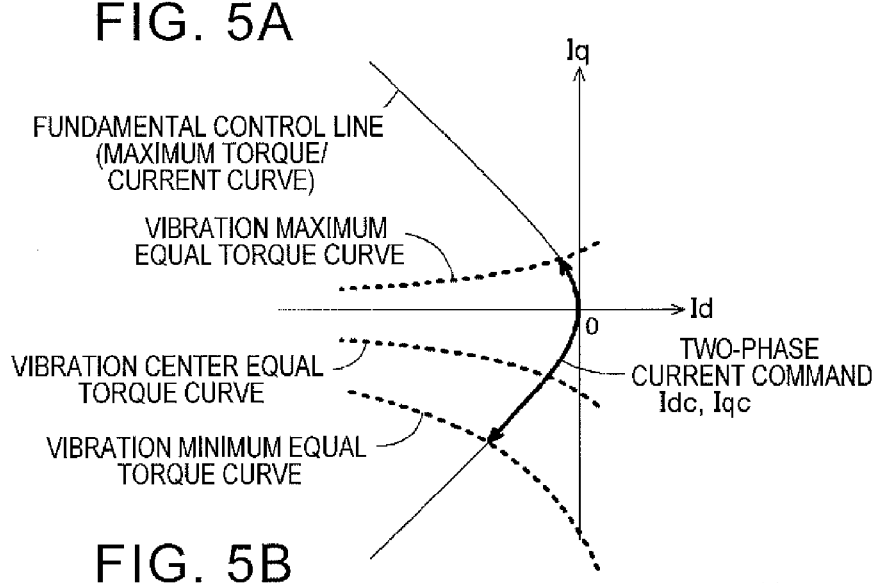
FIGS. 5A and 5B illustrate a process performed by the control device according to the embodiment of the present invention.
Figure 5B:
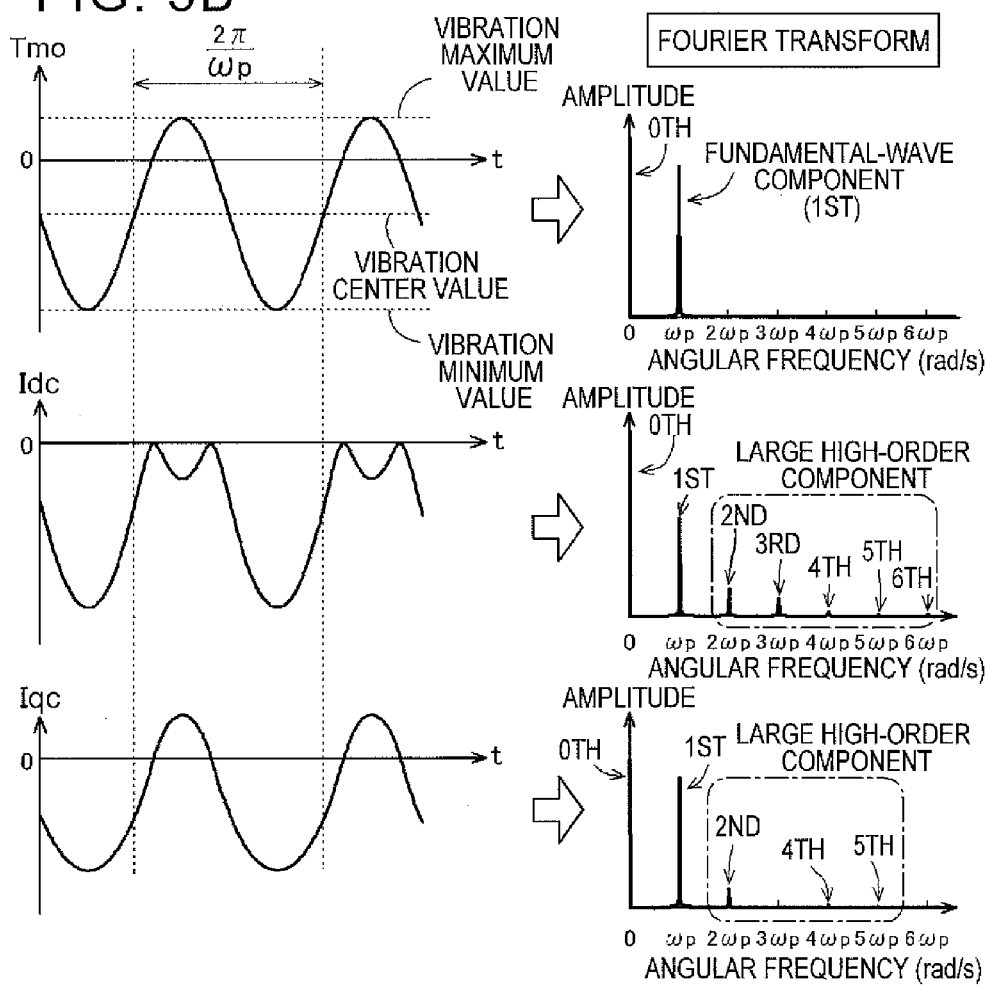

Next, a case where the output torque command value Tmo is periodically vibrating across 0 around a value less than 0 as shown in FIG. 5B will be described.

In this case, as shown in FIG. 5A, the vibration maximum equal torque curve, the vibration minimum equal torque curve, and the vibration center equal torque curve have been shifted such that the q-axis actual current Iq is reduced compared to the case shown in FIG. 4A.

As shown in FIG. 5B, the d-axis current command Idc vibrates with a complicated waveform similar to that obtained by combining first-order (ωp) and second-order (2ωp) frequency components, and the q-axis current command Iqc mainly vibrates at a first-order (ωp) frequency. Therefore, as indicated by the frequency characteristics obtained by performing a Fourier transform on each waveform and shown on the right side in FIG. 5B, the d-axis current command Idc has a large amplitude not only for a first-order (ωp) frequency component but also for second-order (2ωp), third-order (3ωp), fourth-order (4ωp), fifth-order (5ωp), and sixth-order (6ωp) frequency components. The q-axis current command Iqc has a large amplitude not only for a first-order (ωp) frequency component but also for second-order (2ωp), fourth-order (4ωp), and fifth-order (5ωp) frequency components.

<Conclusion to Problem>

As described above, in the case where fundamental control in which the two-phase current commands Idc, Iqc are decided on the maximum torque/current curve (fundamental control line) in the case where the output torque command value Tmo includes periodic torque vibration, the two-phase current commands Idc, Iqc also include a periodic vibration component.

In addition, even if torque vibration included in the output torque command value Tmo is a sine wave, the two-phase current commands Idc, Iqc include a vibration component at a frequency that is higher in order than the torque vibration frequency ωp (first order) with a sine wave in the case where the relationship of the current commands Idc, Iqc with respect to the output torque command value Tmo includes a high-order function component. In particular, the relationship of the d-axis current command Idc with respect to the output torque command value Tmo is represented by a high-order function for values of the output torque command value Tmo around 0. Thus, in the case where the output torque command value Tmo vibrates across 0, second- or higher-order frequency components are significantly increased in the d-axis current command Idc. Meanwhile, the relationship of the q-axis current command Iqc with respect to the output torque command value Tmo includes a large quantity of high-order function components for values of the output torque command value Tmo around 0. Thus, in the case where the output torque command value Tmo vibrates around 0, second- or higher-order frequency components are increased in the q-axis current command Iqc.

If the two-phase current commands Idc, Iqc, which are used as target values in the current feedback control, include a periodic vibration component, it may be difficult to secure the performance of an actual value to follow the periodic vibration component included in the target values through only simple control such as proportional-integral control (PI control).

In order to improve the performance to follow the periodic vibration component included in the two-phase current commands Idc, Iqc, it is conceivable to add a controller etc. based on the internal model principle to be discussed later. However, adding the controller based on the internal model principle complicates the computation process, and increases the computation load on the control device 30.

Further, in the case where the two-phase current commands Idc, Iqc include a plurality of frequency components, it is necessary to individually provide the controller based on the internal model principle for each frequency component in order to improve the performance to follow each frequency component, which increases the number of controllers to be added.

In the case where the output torque command value Tmo vibrates across 0, in particular, a plurality of high-order frequency components included in the d-axis current command Idc are significantly increased, which increases the necessity to add controllers for the high-order frequency components to the current feedback control system for the d axis.

1-2-1-2. d-Axis Command Fixation Control

In order to reduce a periodic vibration component included in the two-phase current commands Idc, Iqc, the torque/current computation section 40 according to the embodiment is configured to execute the d-axis command fixation control.

That is, as described above, the torque/current computation section 40 is configured to execute d-axis command fixation control in the case where the output torque command value Tmo includes periodic torque vibration. In the d-axis command fixation control, the d-axis current fixation section 51 fixes the d-axis current command Idc, which is a d-axis component of the two-phase current commands, at a predetermined value, and the q-axis current setting section 52 vibrates the q-axis current command Iqc, which is a q-axis component of the two-phase current commands, in accordance with the torque vibration.

1-2-1-2-1. q-Axis Current Setting Section 52

In the embodiment, the q-axis current setting section 52 is configured to vibrate the q-axis current command Iqc in accordance with torque vibration on the basis of the output torque command value Tmo including the torque vibration and the fixed d-axis current command Idc.

The method of calculating the q-axis current command Iqc will be described below.

From the theoretical formula of the formula (3), the relationship between the q-axis current command Iqc and the output torque command value Tmo and the d-axis current command Idc can be represented as indicated by the formula (6). Here, the d-axis current command Idc is fixed at a predetermined value, and thus the coefficient by which the output torque command value Tmo is multiplied is fixed at a predetermined value. Hence, in the embodiment, the q-axis current setting section 52 is configured to set the q-axis current command Iqc to a value obtained by multiplying the output torque command value Tmo by a predetermined conversion gain Kid as indicated by the following formula (6):

$$Iqc = \frac{1}{Pn(\Phi + (Ld - Lq)Idc)} Tmo = \text{Kid} \times Tmo \quad (6)$$

Here, the q-axis current setting section 52 is configured to calculate the conversion gain Kid on the basis of the fixed d-axis current command Idc using the relationship between the d-axis current command Idc and the conversion gain Kid indicated by the following formula (7):

$$\text{Kid} = \frac{1}{Pn(\Phi + (Ld - Lq)Idc)} \quad (7)$$

Through such d-axis command fixation control, the q-axis current command Iqc is decided to be directly proportional to the output torque command value Tmo. Hence, as shown in FIGS. 6B, 7B, 8B, 8D, 9B, 9D, 10B, and 10D, in the case where the torque vibration included in the output torque command value Tmo is a sine wave, a vibration component included in the q-axis current command Iqc is also a sine wave with the torque vibration frequency ωp. The d-axis current command Idc does not include a periodic vibration component.

Thus, by executing the d-axis command fixation control in place of the fundamental control in the case where the output torque command value Tmo includes a periodic torque vibration component, it is possible to reduce the periodic vibration component included in the d-axis current command Idc to zero, and to reduce the periodic vibration component in the q-axis current command Iqc to a vibration component that is the same as the torque vibration component.

In the case where the output torque command value Tmo vibrates across 0, in particular, the effect of reducing high-order vibration components in the d-axis current command Idc can be increased.

1-2-1-2-2. d-Axis Current Fixation Section 51

The d-axis current fixation section 51 is configured to fix the d-axis current command Idc at a predetermined value on the basis of the output torque command value Tmo including periodic torque vibration.

Here, to fix the d-axis current command Idc at a predetermined value means not to vary the d-axis current command Idc in accordance with a periodic vibration component included in the output torque command value Tmo. The d-axis current command Idc may be configured to be varied in accordance with variations other than variations in periodic vibration component in the output torque command value Tmo. Alternatively, the d-axis current command Idc may be configured not to be varied in accordance with variations other than variations in periodic vibration component in the output torque command value Tmo, either, but to be fixed at a constant value.

In the embodiment, the d-axis current fixation section 51 is configured to decide the d-axis current command Idc such that the vibration locus of the two-phase current commands Idc, Iqc crosses the fundamental control line at at least one location in the dq-axis rotating coordinate system.

With such a configuration, as shown in FIGS. 6A, 7A, 8A, 8C, 9A, 9C, 10A, and 10C, the two-phase current commands Idc, Iqc can be vibrated in contact with or across the fundamental control line, and the two-phase current commands Idc, Iqc can be brought closer to the fundamental control line. Hence, even in the case where the d-axis command fixation control is executed, it is possible to maintain the effect targeted by the fundamental control with as little reduction in effect as possible. For example, in the case where the fundamental control is the maximum torque/current control as in the embodiment, it is possible to maintain a high current/torque conversion efficiency.

Examples of the method of fixing the d-axis current command Idc according to the embodiment include four schemes to be described below.

<First Scheme>

First, a first scheme of the d-axis command fixation control will be described with reference to FIGS. 6A and 7A.

Figure 6A:
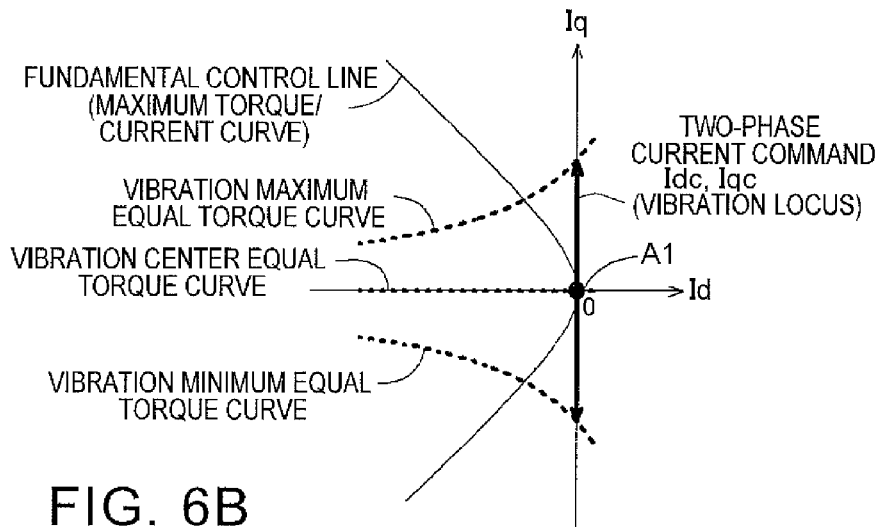
FIGS. 6A and 6B illustrate the process performed by the control device according to the embodiment of the present invention.
Figure 6B:
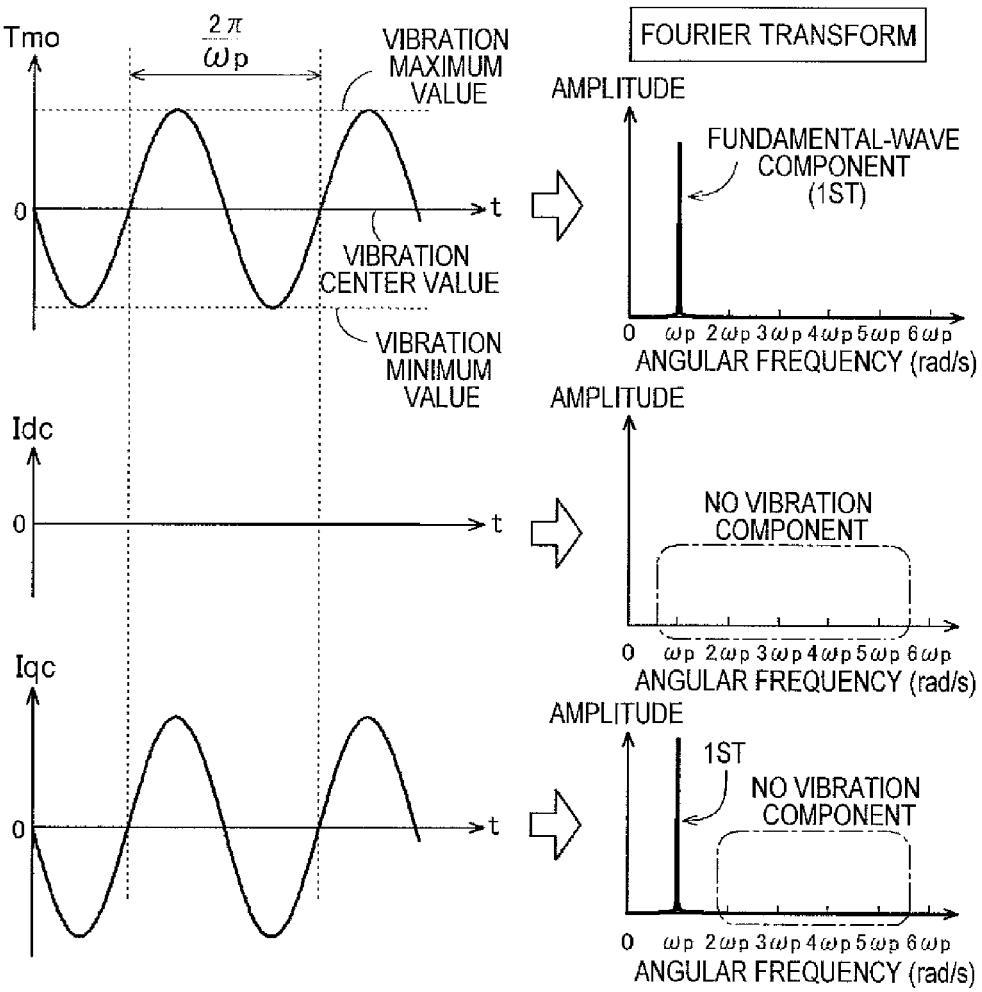
Figure 7A:
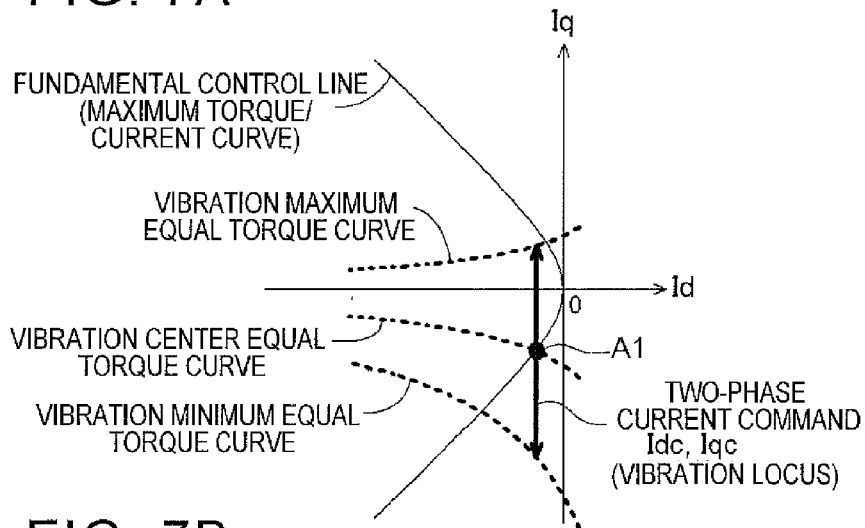
FIGS. 7A and 7B illustrate the process performed by the control device according to the embodiment of the present invention.
Figure 7B:
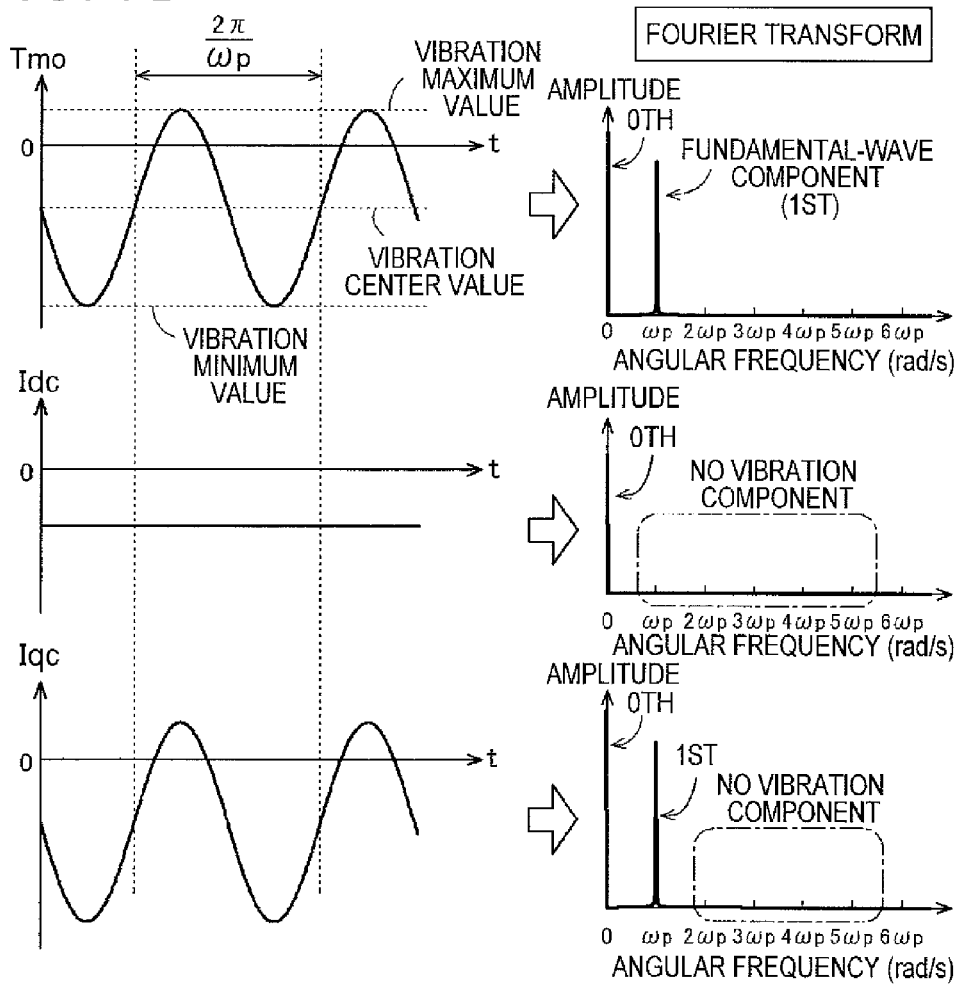

As shown in FIGS. 6A and 7A, the d-axis current fixation section 51 is configured to decide the d-axis current command Idc as a value determined by an intersection A1 of the fundamental control line and the vibration center equal torque curve in executing the d-axis command fixation control.

In this case, the d-axis current fixation section 51 may be configured to decide the d-axis current command Idc on the fundamental control line on the basis of the vibration center value of the output torque command value Tmo by the same method as in the fundamental control. That is, the d-axis current fixation section 51 can calculate the d-axis current command Idc in accordance with the relationship shown in FIG. 3B using the vibration center value of the output torque command value Tmo, which corresponds to the output torque command value Tmo in the fundamental control executed in the case where periodic torque vibration is not included.

Hence, the first scheme can be executed using the process of the fundamental control, and thus it is possible to suppress complication of the computation process and an increase in computation load on the control device 30.

The d-axis current fixation section 51 may set the vibration center value of the output torque command value Tmo to the reference torque command value Tb calculated by the output torque command setting section 39, or to a value obtained by performing a filter process, a moving average process, or the like on the output torque command value Tmo.

<Second Scheme>

Next, a second scheme of the d-axis command fixation control will be described with reference to the FIGS. 8A and 8C.

Figure 8A:
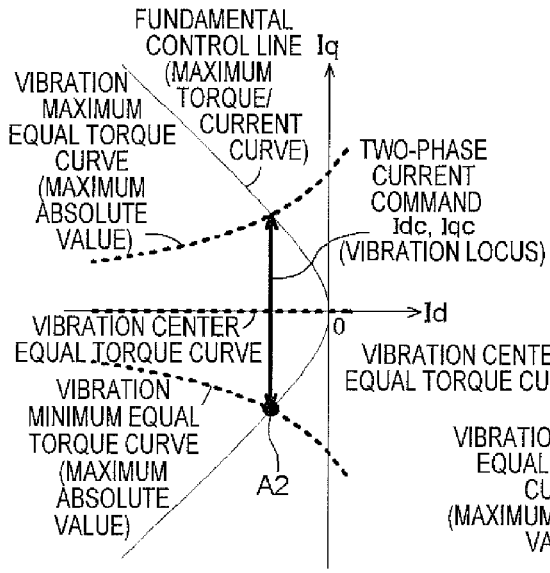
FIGS. 8A to 8D illustrate the process performed by the control device according to the embodiment of the present invention.
Figure 8C:
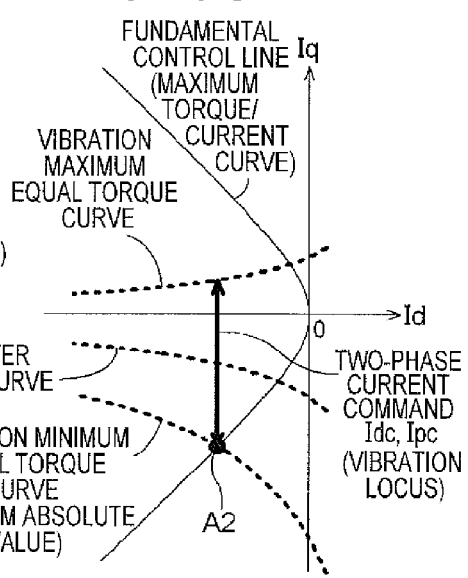
Figure 8B:
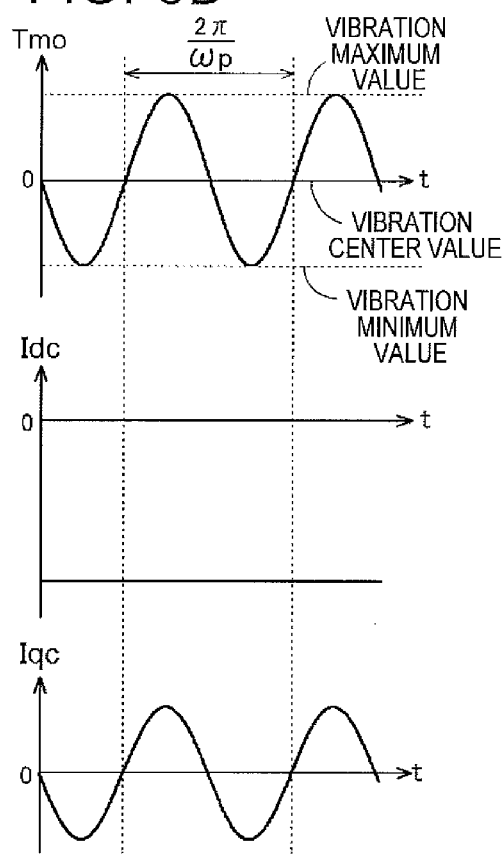
Figure 8D:
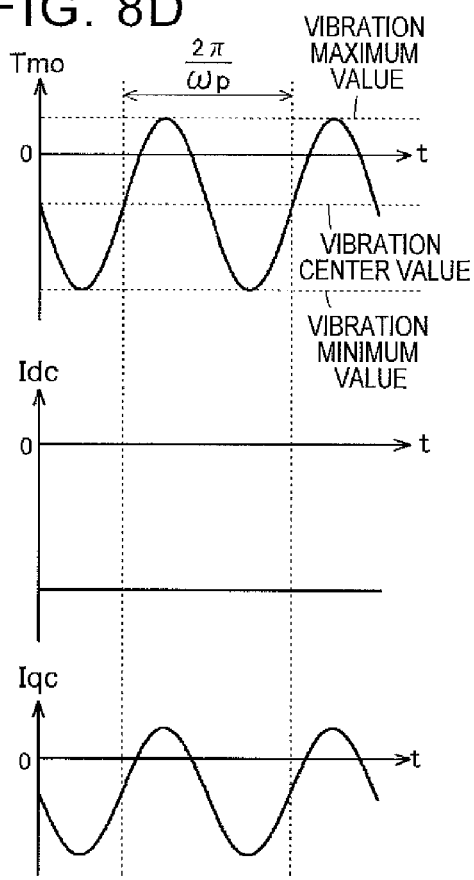

As shown in FIGS. 8A and 8C, the d-axis current fixation section 51 is configured to decide the d-axis current command Idc as a value determined by an intersection A2 of the fundamental control line and a maximum absolute value equal torque curve in executing the d-axis command fixation control.

Here, the maximum absolute value equal torque curve is the locus of coordinate points formed from the d-axis current command Idc and the q-axis current command Iqc at which the output torque Tm of the rotary electric machine MG is one of the vibration maximum value and the vibration minimum value of the output torque command value Tmo, the absolute value of which is the larger, in the dq-axis rotating coordinate system. That is, the maximum absolute value equal torque curve is one of the vibration maximum equal torque curve and the vibration minimum equal torque curve, the absolute value of the output torque command value Tmo of which is the larger. In the case where the absolute value of the vibration maximum value and the absolute value of the vibration minimum value are equal to each other as shown in FIG. 8A, the maximum absolute value equal torque curve may be either of the vibration maximum equal torque curve and the vibration minimum equal torque curve.

In the second scheme, as shown in FIGS. 8A and 8C, the vibration locus of the two-phase current commands Idc, Iqc is positioned within a region on the negative side of the d-axis current command Idc with respect to the fundamental control line (hereinafter referred to as "d-axis negative-side region") in the dq-axis rotating coordinate system. The d-axis negative-side region overlaps a region normally used for control of a rotary electric machine performed using a dq-axis rotating coordinate system. For example, in the flux weakening control described above, the d-axis negative-side region is used to increase the d-axis current command Idc in the negative direction from the fundamental control line in order to decrease flux in the d-axis direction. Therefore, in the d-axis negative-side region, the relationship between the output torque Tm of the rotary electric machine MG and the d-axis current command Idc and the q-axis current command Iqc indicated by the formula (2) is identified with high accuracy because of the flux weakening control. The q-axis current command Iqc in the d-axis command fixation control is calculated on the basis of the relationship indicated by the formulas (6) and (7) obtained from the relationship of the formula (2), and therefore the calculation accuracy can be improved.

<Third Scheme>

Next, a third scheme of the d-axis command fixation control will be described with reference to the FIGS. 9A and 9C.

As shown in FIGS. 9A and 9C, the d-axis current fixation section 51 is configured to decide the d-axis current command Idc such that the amount of current flowing through the rotary electric machine MG during one period of torque vibration included in the output torque command value Tmo is minimized in executing the d-axis command fixation control.

According to the third scheme, it is possible to minimize the amount of current flowing through the rotary electric machine MG during one period, and to minimize heat generated by a resistance R of the coil, that is, the copper loss.

The d-axis current command Idc can be calculated on the basis of the theoretical formula to be described below.

The formula (3) is substituted into the formula (4) to obtain the following formula (8):

$$I^2 = (Id)^2 + \left(\frac{Tm}{Pn(\Phi + (Ld - Lq)Id)}\right)^2 \quad (8)$$

The output torque Tm of the rotary electric machine MG is represented by the following formula (9):

$$Tm = Tb + \Delta Tp \sin\theta \quad (9)$$

The formula (9) is substituted into the formula (8) to obtain the amount of current flowing through the rotary electric machine MG during one period, which is represented by the following formula (10):

$$\int_0^{2\pi} I^2 d\theta = \int_0^{2\pi} \left\{(Id)^2 + \left(\frac{Tb + \Delta Tp\sin\theta}{Pn(\Phi + (Ld - Lq)Id)}\right)^2\right\} d\theta \quad (10)$$

$$= 2\pi(Id)^2 + \frac{(Tb)^2 + \frac{(\Delta Tp)^2}{2}}{(Pn(\Phi + (Ld - Lq)Id))^2}$$

The d-axis current fixation section 51 may be configured to set the d-axis current command Idc to a value of the d-axis actual current Id that minimizes the value of the formula (10).

<Fourth Scheme>

Next, a fourth scheme of the d-axis command fixation control will be described with reference to the FIGS. 10A and 10C.

Figure 10A:
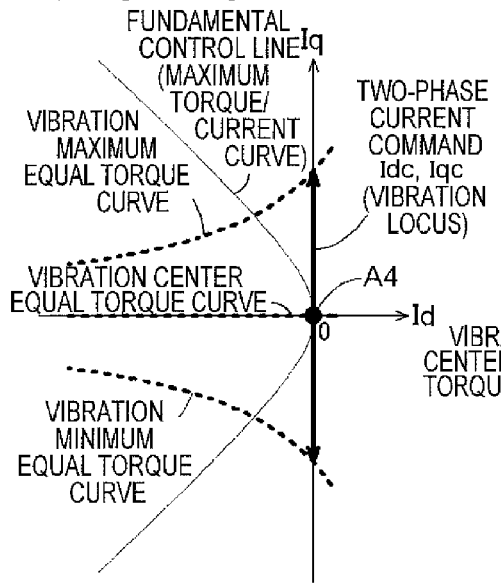
FIGS. 10A to 10D illustrate the process performed by the control device according to the embodiment of the present invention.
Figure 10C:
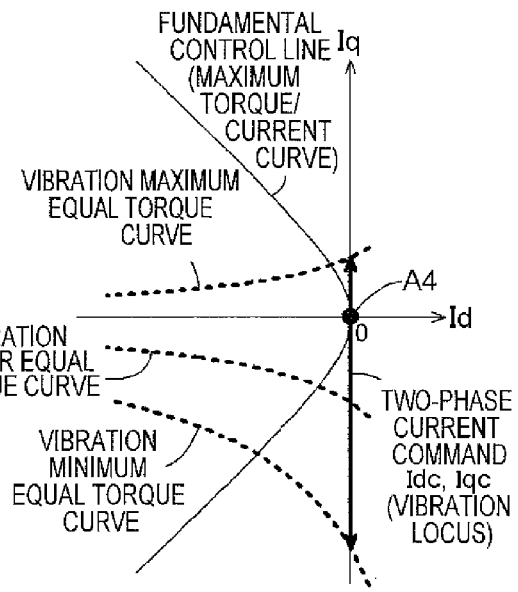
Figure 10B:
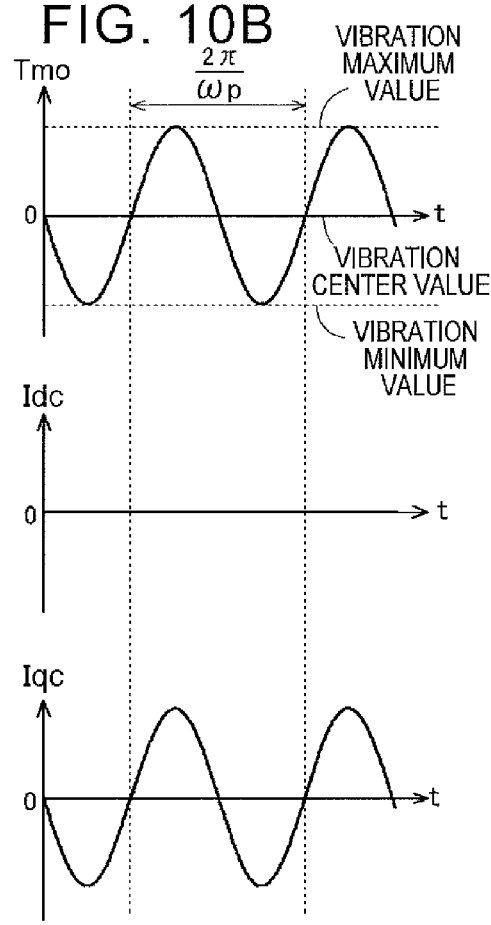
Figure 10D:
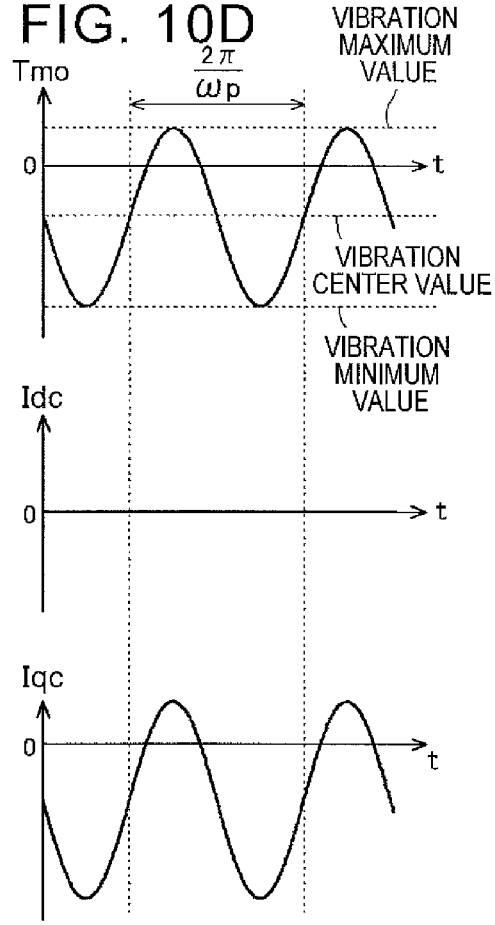

As shown in FIGS. 10A and 10C, the d-axis current fixation section 51 is configured to decide the d-axis current command Idc as 0 in executing the d-axis command fixation control.

According to the fourth scheme, in which the d-axis current command Idc is set to 0, it is possible to minimize the computation process performed by the d-axis current fixation section 51. In addition, setting the d-axis current command Idc to 0 makes (Ld−Lq)Idc in the formulas (6) and (7) also 0. This makes it possible to calculate the q-axis current command Iqc without using the values of the inductances Ld, Lq, and to simplify the computation process performed by the q-axis current setting section 52. Hence, it is possible to suppress complication of the computation process and an increase in computation load on the control device 30.

1-3. Actual Current Computation Section 41

As shown in FIG. 1, the actual current computation section 41 is a functional section that computes two-phase actual currents Id, Iq, represented in the dq-axis rotating coordinate system, on the basis of an actual current that flows through the rotary electric machine MG. In the embodiment, the actual current computation section 41 converts the actual currents Iu, Iv, Iw flowing through the coils for the respective phases into the d-axis actual current Id and the q-axis actual current Iq represented in the dq-axis rotating coordinate system by performing a three-phase/two-phase conversion and a rotating coordinate conversion on the basis of the magnetic pole position θre.

1-4. Current Feedback Control Section 42

The current feedback control section 42 is a functional section that varies two-phase voltage commands Vd, Vq, which are obtained by representing a voltage command for a voltage to be applied to the rotary electric machine MG in the dq-axis rotating coordinate system, such that the two-phase actual currents Id, Iq become closer to the two-phase current commands Idc, Iqc. In the embodiment, as shown in FIG. 1, the current feedback control section 42 calculates the d-axis voltage command Vd through a d-axis proportional-integral controller 53, which performs a proportional-integral computation on the basis of the deviation between the d-axis current command Idc and the q-axis actual current Id, in executing the d-axis command fixation control. In addition, the current feedback control section 42 is configured to calculate the q-axis voltage command Vq through a q-axis proportional-integral controller 54, which performs a proportional-integral computation on the basis of the deviation between the q-axis current command Iqc and the q-axis actual current Iq, and a q-axis harmonic-wave controller 55, which performs a computation using a harmonic-wave model having the characteristics of a periodic function with the torque vibration frequency ωp, in executing the d-axis command fixation control.

The d-axis voltage command Vd is set to a d-axis fundamental voltage command Vbd calculated by the d-axis proportional-integral controller 53. The q-axis voltage command Vq is set to a value obtained by adding a q-axis fundamental voltage command Vbq calculated by the q-axis proportional-integral controller 54 and a q-axis harmonic-wave voltage command Vhq calculated by the q-axis harmonic-wave controller 55.

Here, the d-axis voltage command Vd is a d-axis component of the two-phase voltage command. The d-axis actual current Id is a d-axis component of the two-phase actual current. The q-axis voltage command Vq is a q-axis component of the two-phase voltage command. The q-axis actual current Iq is a q-axis component of the two-phase actual current.

The current feedback control section 42 is configured to calculate the d-axis voltage command Vd through the d-axis proportional-integral controller 53, and to calculate the q-axis voltage command Vq through the q-axis proportional-integral controller 54 without using the q-axis harmonic-wave controller 55, in executing the fundamental control. That is, the d-axis proportional-integral controller 53 and the q-axis proportional-integral controller 54 are controllers used in common to the fundamental control and the d-axis command fixation control, and the q-axis harmonic-wave controller 55 is a controller used exclusively for the d-axis command fixation control.

1-4-1. Proportional-Integral Controller

In the embodiment, the proportional-integral controllers 53 and 54 are proportional-integral (PI) controllers that calculate the fundamental voltage commands Vbd, Vbq by performing a proportional computation and an integral computation on the basis of the current deviation between the two-phase actual currents Id, Iq and the two-phase current commands Idc, Iqc as indicated by the following formulas (11) and (12):

$$Vbd = \left(Kpd + Kid\frac{1}{s}\right)(Idc - Id) \quad (11)$$

$$Vbq = \left(Kpq + Kiq\frac{1}{s}\right)(Iqc - Iq) \quad (12)$$

where Kpd is a d-axis proportional gain, Kpq is a q-axis proportional gain, Kid is a d-axis integral gain, and Kiq is a q-axis integral gain.

The proportional-integral controllers 53 and 54 may be controllers other than proportional-integral (PI) controllers, and may be proportional-integral-differential (PID) controllers, for example.

Moreover, the current feedback control section 42 may be additionally provided with a non-interacting unit such as that indicated by the following formula (13) in addition to the proportional-integral controllers 53 and 54. In this case, values ΔVd, ΔVq calculated by the non-interacting unit are additionally added to the two-phase voltage commands Vd, Vq.

$$\Delta Vd = -(\omega reLq)Iqc, \Delta Vq = (\omega reLd)Idc + \omega re\Phi \quad (13)$$

1-4-2. Harmonic-Wave Controller

<Error in Following Periodic Vibration Component>

In the case where the non-interacting unit is provided, transfer functions representing the response of the two-phase actual currents Id, Iq flowing through the rotary electric machine MG to the two-phase voltage commands Vd, Vq excluding the values ΔVd, ΔVq calculated by the non-interacting unit can be represented by a first-order delay using the inductances Ld, Lq and the resistance R of the coil as indicated by the following formula (14):

$$Id = \frac{1}{Lds + R}(Vd - \Delta Vd),$$

$$Iq = \frac{1}{Lqs + R}(Vq - \Delta Vq) \quad (14)$$

In the case where the two-phase current commands Idc, Iqc do not include a periodic vibration component, the two-phase actual currents Id, Iq can be caused to follow the two-phase current commands Idc, Iqc without steady-state deviation with only the proportional-integral controllers 53 and 54.

In the case where the two-phase current commands Idc, Iqc include a periodic vibration component, however, the two-phase actual currents Id, Iq follow the periodic vibration component in the two-phase current commands Idc, Iqc with a phase delay to cause steady-state deviation with only the proportional-integral controllers. For example, as shown in the time chart of FIG. 11, during a period before time t11, the q-axis voltage command Vq is calculated with only the q-axis proportional-integral controller 54, and the q-axis actual current Iq follows the q-axis current command Iqc, which is periodically vibrating, with a phase delay and a gain reduction, and has steady-state deviation.

<Internal Model Principle>

Thus, in order to cause the actual current to follow the command value without steady-state deviation, it is conceivable to use a control theory based on the internal model principle, that it is effective to introduce a controller having the same pole as the pole of the command value into the feedback system.

In the case where the two-phase current commands Idc, Iqc include a periodic vibration component with a sine wave (or a cosine wave) with a frequency n times the torque vibration frequency $\omega p$, the q-axis current command Iqc can be represented, in the time domain, by the following formula (15):

$$Iqc(t) = a_0 + a_n \sin(n\omega p t) \tag{15}$$

The q-axis current command Iqc in the formula (15) can be represented, in the frequency domain (s domain), by the transfer function of the following formula (16). Here, s is a Laplace operator.

$$Iqc(s) = a_0 \frac{1}{s} + a_n \frac{n\omega p}{s^2 + (n\omega p)^2} \tag{16}$$

In the case where the q-axis current command Iqc is a cosine wave, the q-axis current command Iqc can be represented by the following transfer function:

$$Iqc(s) = a_0 \frac{1}{s} + a_n \frac{s}{s^2 + (n\omega p)^2} \tag{17}$$

From the formulas (15) and (16), the value of s that makes the pole of the two-phase current commands Idc, Iqc, that is, the denominator of the transfer function, 0 is obtained by the following formula:

$$s = 0, \pm j(n\omega p) \tag{18}$$

Hence, according to the internal model principle, it is possible to cause the actual current to follow the command value without steady-state deviation by forming a transfer function Gfb of the current feedback control section 42 so as to have the pole of the formula (18) as indicated by the following formula:

$$Gfb(s) = \frac{b_0}{s} + \frac{B_n(s)}{s^2 + (n\omega p)^2} \tag{19}$$

The first term on the right side of the formula (19) is included as the integral computation performed by the proportional-integral controllers 53 and 54.

<Harmonic-Wave Model>

Hence, in the case where the two-phase current commands Idc, Iqc include a vibration component with a sine wave (or a cosine wave) with a frequency n times the torque vibration frequency $\omega p$, it is necessary to use not only the proportional-integral controllers 53 and 54 but also a harmonic-wave model having the characteristics of a transfer function Gh indicated by the following formula (20), which is obtained by removing the first term on the right side of the formula (19), in order to decrease steady-state deviation:

$$Gh(s) = \frac{B_n(s)}{s^2 + (n\omega p)^2} \tag{20}$$

Here, the denominator $(s^2+(n\omega p)^2)$ of the transfer function Gh of the harmonic-wave model indicated by the formula (20) is a transfer function corresponding to a periodic function with a sine wave or a cosine wave with a frequency n times the torque vibration frequency $\omega p$.

The numerator $B_n(s)$ of the transfer function Gh of the harmonic-wave model indicated by the formula (20) is set so as to secure the stability of the current feedback control system.

For example, the numerator $B_n(s)$ of the transfer function Gh of the harmonic-wave model may be a 0th order (s to the power of 0) transfer function as indicated by the following formula (21):

$$B_n(s) = Kh_n \tag{21}$$

In addition, the numerator $B_n(s)$ of the transfer function Gh of the harmonic-wave model may be a first-order (s to the power of 1) or second-order (s to the power of 2) transfer function as indicated by the following formulas (22) and (23):

$$B_n(s) = Kh_n s \tag{22}$$

$$B_n(s) = Khp_n s^2 + Khi_n s \tag{23}$$

where Khn, Khpn, and Khin are each a control gain.

In the case where the two-phase current commands Idc, Iqc include vibration components at a plurality of frequencies, it is necessary to use a plurality of harmonic-wave models corresponding to the respective frequencies in parallel in order to decrease steady-state deviation due to the vibration components at the respective frequencies.

As described above, in the case where the fundamental control is executed in the case where the output torque command value Tmo includes torque vibration unlike the embodiment of the present invention, both the d-axis current command Idc and the q-axis current command Iqc include a periodic vibration component. Hence, if it is attempted to handle the case where the output torque command value Tmo includes torque vibration by executing the fundamental control without executing the d-axis command fixation control, it is necessary to use a harmonic-wave model not only in the current feedback control system for the q axis but also in the current feedback control system for the d axis.

In addition, the two-phase current commands Idc, Iqc include not only a frequency component at the torque vibration frequency $\omega p$ (first order) but also a plurality of high-order frequency components. In this case, it is necessary to use a plurality of harmonic-wave models corresponding to the respective frequencies in parallel in order to decrease steady-state deviation. This complicates the computation process, and increases the computation load on the control device 30. In the case where the output torque command value Tmo vibrates across 0, in particular, a plurality of high-order frequency components included in the d-axis current command Idc are increased, which makes it highly necessary to use a plurality of harmonic-wave models.

In the case where the d-axis command fixation control is executed as in the embodiment of the present invention, on the other hand, it is possible to cause the d-axis current command Idc to include no periodic vibration component, and to cause the q-axis current command Iqc to include only a vibration component at the torque vibration frequency ωp, for the output torque command value Tmo including torque vibration with a sine wave. Hence, in the embodiment, it is only necessary to use one harmonic-wave model corresponding to the torque vibration frequency ωp for the current feedback control system for the q axis in order to decrease steady-state deviation due to a periodic vibration component.

That is, in the embodiment, the q-axis harmonic-wave controller 55 is set to a harmonic-wave model having the characteristics of a periodic function with a sine wave or a cosine wave with the torque vibration frequency ωp such as that indicated by the transfer function of the following formula (24):

$$Gh(s) = \frac{B_1(s)}{s^2 + \omega p^2} \quad (24)$$

Here, the numerator B1(s) of the transfer function Gh of the harmonic-wave model of the formula (24) is set as indicated by the formulas (21), (22), and (23).

The q-axis harmonic-wave controller 55 which uses the harmonic-wave model of the formulas (24) and (21) may be configured to calculate the q-axis harmonic-wave voltage command Vhq through computation having two integrators (1/s) and a feedback loop on the basis of the current deviation between the q-axis current command Iqc and the q-axis actual current Iq as indicated by the following formula (25):

$$Vhq = \frac{1}{s}\frac{1}{s}\{Kh_1(Iqc - Iq) - \omega p^2 Vhq\} \quad (25)$$

In this way, in the embodiment, the number of harmonic-wave models provided in the current feedback control section 42 can be reduced to one, and it is possible to suppress complication of the computation process and an increase in computation load on the control device 30. In the case where the output torque command value Tmo vibrates across 0, in particular, the suppression effect for the d axis is enhanced.

<Behavior During Harmonic-Wave Control>

Next, the behavior during the harmonic-wave control will be described with reference to FIG. 11.

Figure 11:
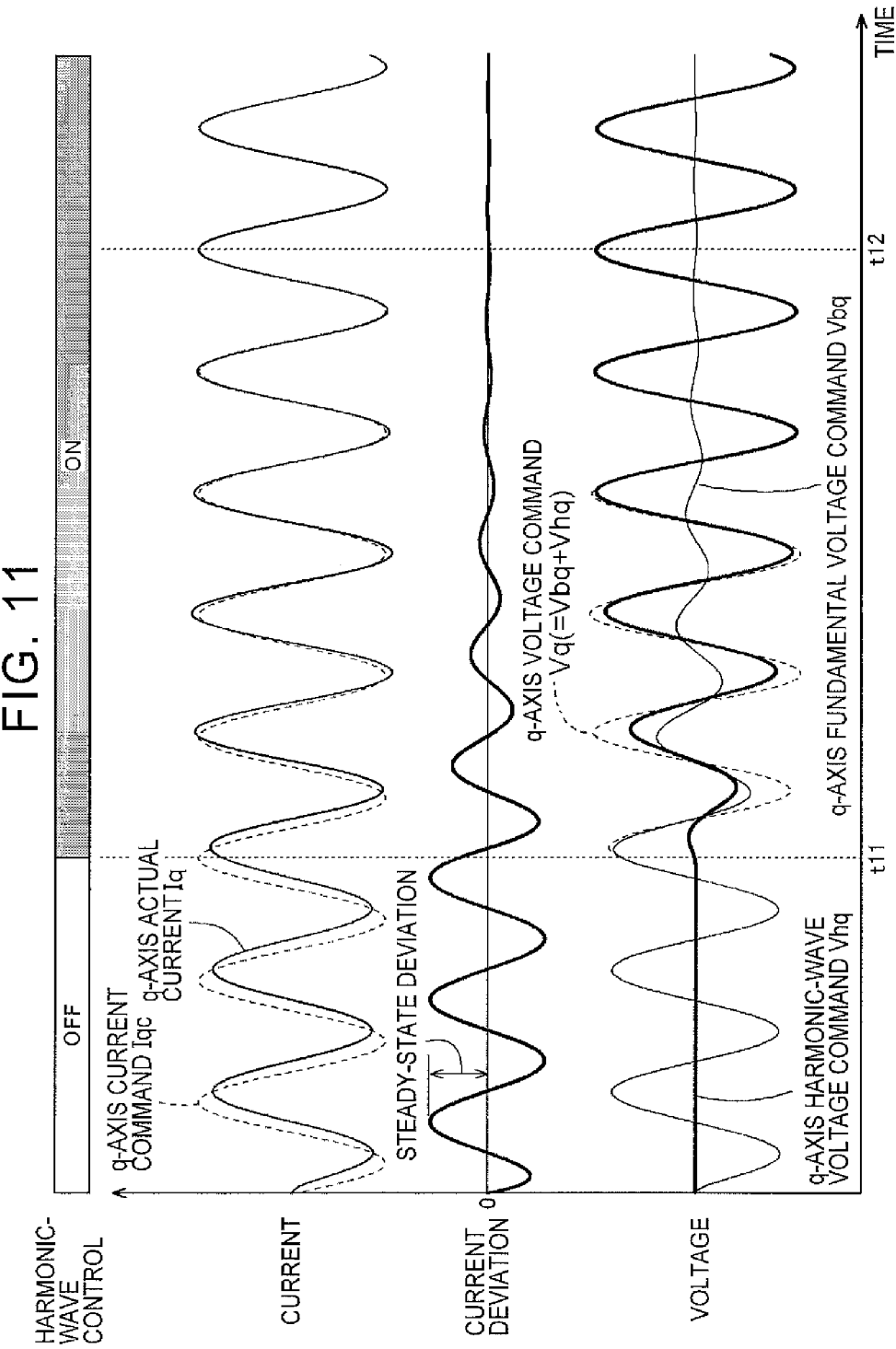
FIG. 11 is a time chart illustrating the process performed by the control device according to the embodiment of the present invention.

In FIG. 11, the d-axis command fixation control is executed, and thus the q-axis current command Iqc is a sine wave (or a cosine wave) with the torque vibration frequency ωp, which is the same as the output torque command value Tmo.

In order to clearly show the effect of the harmonic-wave control, the harmonic-wave control is not executed before time t11. That is, the q-axis harmonic-wave voltage command Vhq is set to 0, and the q-axis voltage command Vq is the q-axis fundamental voltage command Vbq calculated by the q-axis proportional-integral controller 54. In the case where the harmonic-wave control is not executed, the q-axis fundamental voltage command Vbq is periodically varied to cause the q-axis actual current Iq to coincide with the q-axis current command Iqc which is vibrating at the torque vibration frequency ωp. However, the q-axis actual current Iq follows the q-axis current command Iqc, which is periodically vibrating, with a phase delay and a gain reduction, and has steady-state deviation in current deviation.

When the harmonic-wave control is started at time t11, meanwhile, the q-axis harmonic-wave voltage command Vhq starts vibrating in a self-excited manner at the torque vibration frequency ωp and at an increasing amplitude in accordance with the current deviation between the q-axis current command Iqc and the q-axis actual current Iq. In this event, the harmonic-wave model integrates the current deviation and vibrates at the torque vibration frequency ωp in a self-excited manner to generate the q-axis harmonic-wave voltage command Vhq. In addition, the current deviation is vibrating at the torque vibration frequency ωp. Therefore, the phase of the q-axis harmonic-wave voltage command Vhq vibrating at the torque vibration frequency ωp is advanced or delayed such that the current deviation is decreased, and the amplitude of the q-axis harmonic-wave voltage command Vhq is increased or decreased such that the current command is decreased. Hence, the current deviation between the q-axis current command Iqc and the q-axis actual current Iq is decreased.

Therefore, the q-axis fundamental voltage command Vbq calculated in accordance with the current deviation is also decreased. Then, at time t12, steady-state deviation is decreased using the q-axis harmonic-wave voltage command Vhq, which makes it possible to cause the q-axis actual current Iq to follow the q-axis current command Iqc, and to decrease periodic variations in q-axis fundamental voltage command Vbq to close to 0.

1-5. Two-Phase/Three-Phase Voltage Conversion Section 43

The two-phase/three-phase voltage conversion section 43 is a functional section that converts the two-phase voltage commands Vd, Vq calculated by the current feedback control section 42 into the voltage commands Vu, Vv, Vw for the three phases. That is, the two-phase/three-phase voltage conversion section 43 converts the two-phase voltage commands Vd, Vq, represented in the dq-axis rotating coordinate system, into the three-phase voltage commands Vu, Vv, Vw, which are voltage commands for the coils for the respective phases, by performing a fixed coordinate conversion and a two-phase/three-phase conversion on the basis of the magnetic pole position θre.

1-6. Inverter Control Section 44

The inverter control section 44 generates on the basis of the three-phase voltage commands Vu, Vv, Vw an inverter control signal Suvw for controlling on and off a plurality of switching elements provided in the inverter IN.

In the embodiment, the inverter control section 44 generates the inverter control signal Suvw through various types of pulse width modulation (PWM) based on a comparison between the three-phase voltage commands Vu, Vv, Vw and a carrier wave. The plurality of switching elements provided in the inverter IN are controlled on and off on the basis of the inverter control signal Suvw.

The scheme of the pulse width modulation may be switched among sinusoidal PWM (SPWM), space vector PWM (SVPWM), third harmonics injection PWM (THIPWM), discontinuous PWM (DPWM), and so forth.

[Other Embodiments]

Lastly, other embodiments of the present invention will be described. The configuration of each embodiment described below is not limited to its independent application, and may be applied in combination with the configuration of other embodiments unless any contradiction occurs.

Figure 12:
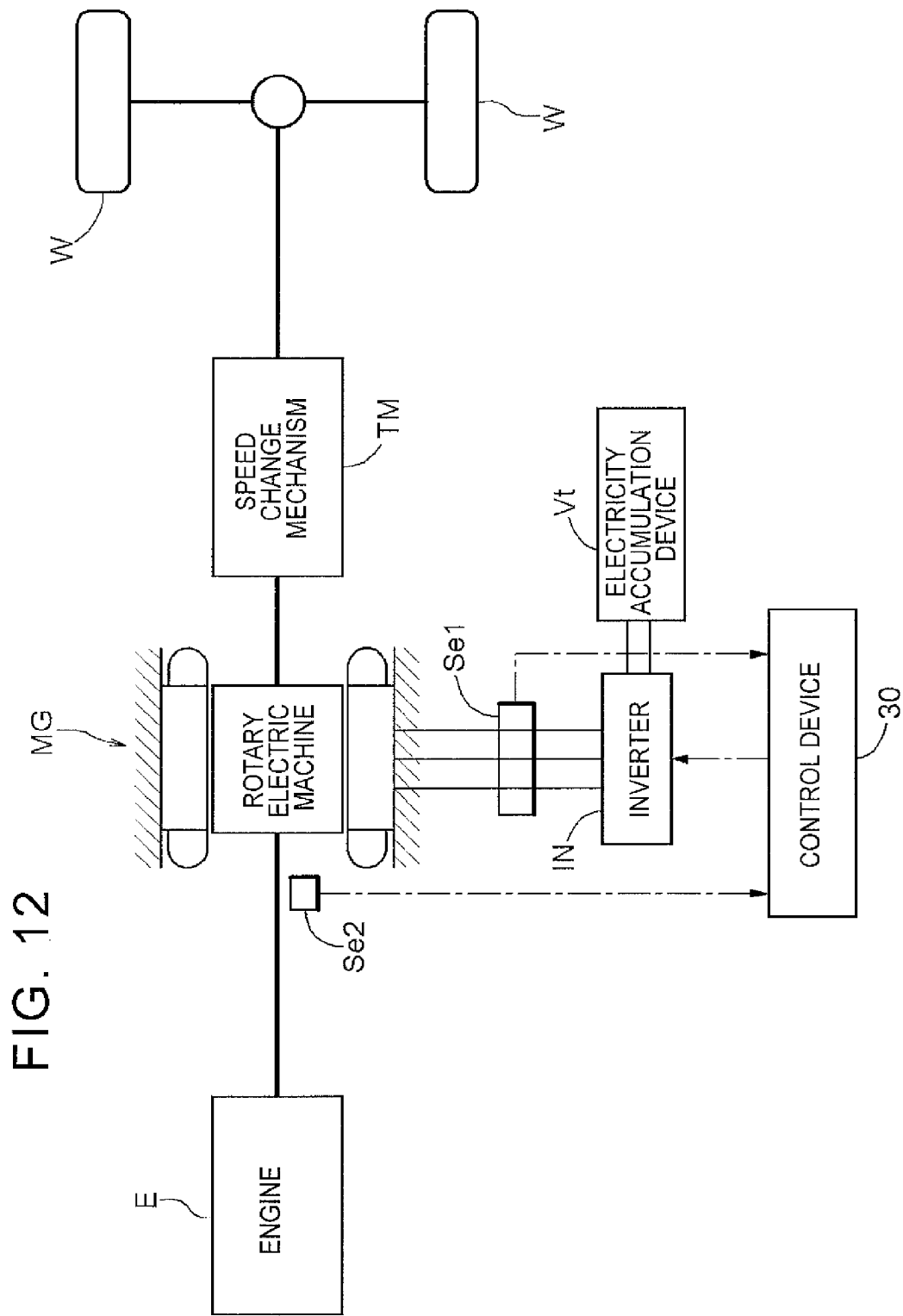
FIG. 12 is a schematic diagram showing a schematic configuration of a rotary electric machine and a control device according to another embodiment of the present invention.

(1) The rotary electric machine MG may be configured to be drivably coupled to an engine E as an internal combustion engine and drivably coupled to wheels W as shown in FIG. 12. In the example shown in FIG. 12, a speed change mechanism TM is provided on a portion of a power transfer path between the rotary electric machine MG and the wheels W.

In the case of this configuration, the output torque command value Tmo may be a torque command for canceling torque vibration transferred from the engine E to the rotary electric machine MG. In this case, the torque vibration frequency ωp is set to a frequency matching the combustion frequency of the engine E.

(2) In the embodiment described above, the output torque command setting section 39 provided in the control device 30 sets the output torque command value Tmo. However, embodiments of the present invention are not limited thereto. That is, the output torque command value Tmo or the vibration torque command value Tp may be transferred from an external device to the control device 30.

(3) In the embodiment described above, the d-axis command fixation control is executed in the case where the output torque command value Tmo includes a sine wave (or a cosine wave) with the torque vibration frequency ωp. However, embodiments of the present invention are not limited thereto. That is, the d-axis command fixation control may be executed in the case where the output torque command value Tmo includes periodic torque vibration. For example, the periodic torque vibration may be represented by a periodic function with a wave formed from a plurality of sine waves (or cosine waves) with different frequencies, a triangular wave, a sawtooth wave, or any waveform. Also in this case, it is possible to reduce the periodic vibration component included in the d-axis current command Idc to 0, and to reduce the periodic vibration component included in the q-axis current command Iqc to a vibration component that is the same as the torque vibration component, by executing the d-axis command fixation control.

Also in this case, the q-axis harmonic-wave controller 55 may be configured to include a plurality of harmonic-wave models having different frequencies in accordance with the periodic torque vibration included in the output torque command value Tmo.

(4) In the embodiment described above, the d-axis current fixation section 51 is configured to decide the d-axis current command Idc such that the vibration locus of the two-phase current commands Idc, Iqc crosses the fundamental control line at at least one location. However, embodiments of the present invention are not limited thereto. That is, the d-axis current fixation section 51 may be configured to decide the d-axis current command Idc such that the vibration locus of the two-phase current commands Idc, Iqc does not cross the fundamental control line. For example, the d-axis current fixation section 51 may be configured to decide the d-axis current command Idc such that the vibration locus of the two-phase current commands Idc, Iqc is positioned within the d-axis negative-side region and does not cross the fundamental control line.

(5) In the embodiment described above, the d-axis current fixation section 51 is configured to decide the d-axis current command Idc using the first scheme, the second scheme, the third scheme, or the fourth scheme. However, embodiments of the present invention are not limited thereto. That is, the d-axis current fixation section 51 may decide the d-axis current command Idc using a scheme other than the schemes described above as long as the vibration locus of the two-phase current commands Idc, Iqc crosses the fundamental control line at at least one location.

(6) In the embodiment described above, the current feedback control section 42 calculates the q-axis voltage command Vq through the q-axis proportional-integral controller 54 and the q-axis harmonic-wave controller 55 in executing the d-axis command fixation control. However, embodiments of the present invention are not limited thereto. That is, the current feedback control section 42 may be configured to calculate the q-axis voltage command Vq through only the q-axis proportional-integral controller 54 without using the q-axis harmonic-wave controller 55 in executing the d-axis command fixation control. Also in this case, vibration components at high-order frequencies compared to the torque vibration frequency ωp have been reduced from the q-axis current command Iqc, and thus degradation in following performance can be suppressed using the q-axis harmonic-wave controller 55.

(7) In the embodiment described above, the torque/current computation section 40 is configured to execute the d-axis command fixation control in the case where the output torque command value Tmo includes periodic torque vibration. However, embodiments of the present invention are not limited thereto. That is, the torque/current computation section 40 may be configured to execute the d-axis command fixation control only in the case where the output torque command value Tmo is vibrating around or across 0, even in the case where the output torque command value Tmo includes periodic torque vibration, and to execute the fundamental control otherwise.

As described above, during execution of the fundamental control, the two-phase current commands Idc, Iqc include a large quantity of vibration components at high-order frequencies compared to the torque vibration frequency ωp in the case where the output torque command value Tmo is vibrating around or across 0. Thus, the fundamental control may be performed otherwise.

The present invention may be suitably applied to a control device that controls a rotary electric machine having a rotor.

The invention claimed is:

1. A control device that controls a rotary electric machine having a rotor, comprising:

a torque/current computation section that uses a two-axis rotating coordinate system that is a rotating coordinate system with two axes that rotate in synchronization with an electrical angle of the rotor, and that computes a two-phase current command obtained by representing a command value for a current caused to flow through the rotary electric machine using the two-axis rotating coordinate system on the basis of a torque command for torque to be output from the rotary electric machine;

an actual current computation section that computes a two-phase actual current represented in the two-axis rotating coordinate system on the basis of an actual current that flows through the rotary electric machine;

a current feedback control section that varies a two-phase voltage command, which is obtained by representing a voltage command for a voltage to be applied to the rotary electric machine in the two-axis rotating coordinate system, such that the two-phase actual current becomes closer to the two-phase current command; and a voltage control section that controls a voltage to be applied to the rotary electric machine on the basis of the two-phase voltage command, wherein:

the two-axis rotating coordinate system has a first axis defined in a direction of field magnetic flux of a magnet provided in the rotor, and a second axis defined in a direction that is shifted by an electrical angle of 90 degrees with respect to the first axis; and in the case where the torque command includes periodic torque vibration, the torque/current computation section executes first-axis command fixation control in which a first-axis current command, which is a first-axis component of the two-phase current in the case where the torque command includes periodic torque vibration, the torque/current computation section executes first-axis command fixation control in which a first-axis current command, which is a first-axis component of the two-phase current command, is fixed at a predetermined value and a second-axis current command, which is a second-axis component of the two-phase current command, is vibrated in accordance with the torque vibration.

2. The control device according to claim 1, wherein:
a fundamental control line prescribes a two-phase current command for fundamental control performed to cause the rotary electric machine to output output torque matching the torque command in the case where the torque command does not include the torque vibration, the fundamental control line being a locus of coordinate points having such first-axis current command and second-axis current command that the first-axis current command becomes larger in a negative direction as an absolute value of the second-axis current command becomes larger from an origin in the two-axis rotating coordinate system; and
in executing the first-axis command fixation control, the torque/current computation section decides the first-axis current command such that a vibration locus of the two-phase current command crosses the fundamental control line at at least one location in the two-axis rotating coordinate system.

3. The control device according to claim 1, wherein
in executing the first-axis command fixation control, the current feedback control section calculates a first-axis voltage command, which is a first-axis component of the two-phase voltage command, through proportional-integral computation on the basis of deviation between the first-axis current command and a first-axis component of the two-phase actual current, and calculates a second-axis voltage command, which is a second-axis component of the two-phase voltage command, through proportional-integral computation and computation performed using a harmonic-wave model having characteristics of a periodic function with a frequency of the torque vibration on the basis of deviation between the second-axis current command and a second-axis component of the two-phase actual current.

4. The control device according to claim 1, wherein:
a fundamental control line prescribes a two-phase current command for fundamental control performed to cause the rotary electric machine to output output torque matching the torque command in the case where the torque command does not include the torque vibration, the fundamental control line being a locus of coordinate points having such first-axis current command and second-axis current command that the first-axis current command becomes larger in a negative direction as an absolute value of the second-axis current command becomes larger from an origin in the two-axis rotating coordinate system;
a vibration center equal torque curve is a locus of coordinate points having the first-axis current command and the second-axis current command at which output torque of the rotary electric machine is a vibration center value of the torque command in the two-axis rotating coordinate system; and
in executing the first-axis command fixation control, the torque/current computation section decides the first-axis current command as a value determined by an intersection of the fundamental control line and the vibration center equal torque curve.

5. The control device according to claim 1, wherein:
a fundamental control line prescribes a two-phase current command for fundamental control performed to cause the rotary electric machine to output output torque matching the torque command in the case where the torque command does not include the torque vibration, the fundamental control line being a locus of coordinate points having such first-axis current command and second-axis current command that the first-axis current command becomes larger in a negative direction as an absolute value of the second-axis current command becomes larger from an origin in the two-axis rotating coordinate system;
a maximum absolute value equal torque curve is a locus of coordinate points having the first-axis current command and the second-axis current command at which output torque of the rotary electric machine is one of a vibration maximum value and a vibration minimum value of the torque command, an absolute value of which is larger, in the two-axis rotating coordinate system; and
in executing the first-axis command fixation control, the torque/current computation section decides the first-axis current command as a value determined by an intersection of the fundamental control line and the maximum absolute value equal torque curve.

6. The control device according to claim 1, wherein
in executing the first-axis command fixation control, the torque/current computation section decides the first-axis current command so as to minimize an amount of current flowing through the rotary electric machine during one period of the torque vibration.

7. The control device according to claim 1, wherein
in executing the first-axis command fixation control, the torque/current computation section decides the first-axis current command as 0.

8. The control device according to claim 1, wherein
the torque vibration is sinusoidal.

9. The control device according to claim 2, wherein
the fundamental control line is a maximum torque/current curve that is a locus of coordinate points having the first-axis current command and the second-axis current command at which output torque of the rotary electric machine is maximum for a magnitude of a current flowing through the rotary electric machine.

10. The control device according to claim 4, wherein
the fundamental control line is a maximum torque/current curve that is a locus of coordinate points having the first-axis current command and the second-axis current command at which output torque of the rotary electric machine is maximum for a magnitude of a current flowing through the rotary electric machine.

11. The control device according to claim 5, wherein
the fundamental control line is a maximum torque/current curve that is a locus of coordinate points having the first-axis current command and the second-axis current command at which output torque of the rotary electric machine is maximum for a magnitude of a current flowing through the rotary electric machine.

* * * * *